US008632099B2

(12) United States Patent
Conny et al.

(10) Patent No.: US 8,632,099 B2
(45) Date of Patent: Jan. 21, 2014

(54) TANK TRAILER HAVING AN AIR ACTUATED HANDRAIL ASSEMBLY

(75) Inventors: Michael A. Conny, Beloit, OH (US);
Scott A. Kibler, Kensington, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 106 days.

(21) Appl. No.: 13/295,694

(22) Filed: Nov. 14, 2011

(65) Prior Publication Data
US 2013/0119651 A1    May 16, 2013

(51) Int. Cl.
*B60P 3/22* (2006.01)
(52) U.S. Cl.
USPC .......................... 280/837; 280/830; 182/113
(58) Field of Classification Search
USPC ................... 256/59, 60, 65.01; 280/837, 830; 52/123.1; 182/113
See application file for complete search history.

(56) References Cited

U.S. PATENT DOCUMENTS

| 933,740 | A | * | 9/1909 | Bond | 182/62 |
| 4,371,056 | A | * | 2/1983 | Anglade | 182/127 |
| 4,759,437 | A | * | 7/1988 | Bevins | 198/632 |
| 5,749,436 | A | * | 5/1998 | Satchwell, III | 182/127 |
| 5,921,531 | A | * | 7/1999 | Early | 256/67 |
| 7,174,993 | B2 | * | 2/2007 | Lantz | 182/127 |
| 2003/0020253 | A1 | * | 1/2003 | Albert Bosman et al. | 280/164.1 |

* cited by examiner

*Primary Examiner* — Tony Winner
(74) *Attorney, Agent, or Firm* — Sand & Sebolt

(57) ABSTRACT

A handrail assembly for a tank trailer and a yoke assembly for the same. Handrail assembly provides a safety device for an operator walking along a top wall of the tank trailer. The handrail assembly includes a top rail, a plurality of vertical members, a safety wire and, sometimes, a bottom rail. Each yoke assembly secures one of the top and bottom ends of the vertical members to either of the top and bottom rails or to a mounting bracket on the tank. Each yoke assembly includes a base member engaged partially in a bore of the vertical member, and a cradle member engaged with an exterior wall of the top or bottom rails or mounting bracket. Base and cradle members are secured together by a pivot pin. Fluid-actuated cylinders extending between the vertical members and the tank move the handrail assembly between collapsed and expanded positions.

26 Claims, 14 Drawing Sheets

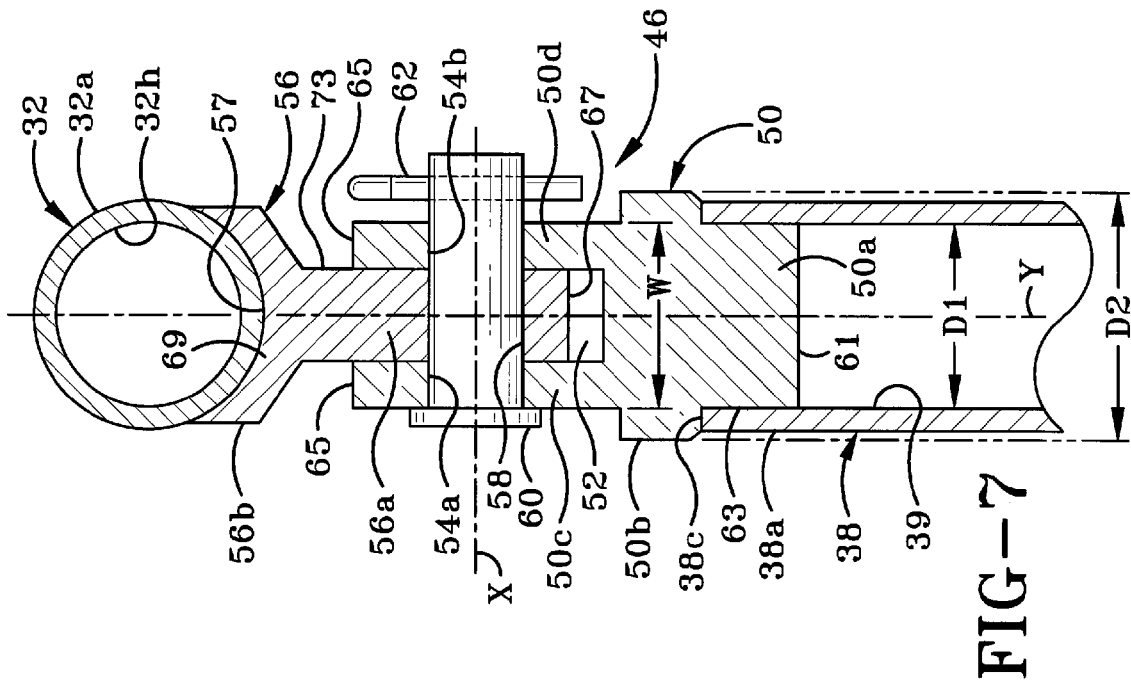
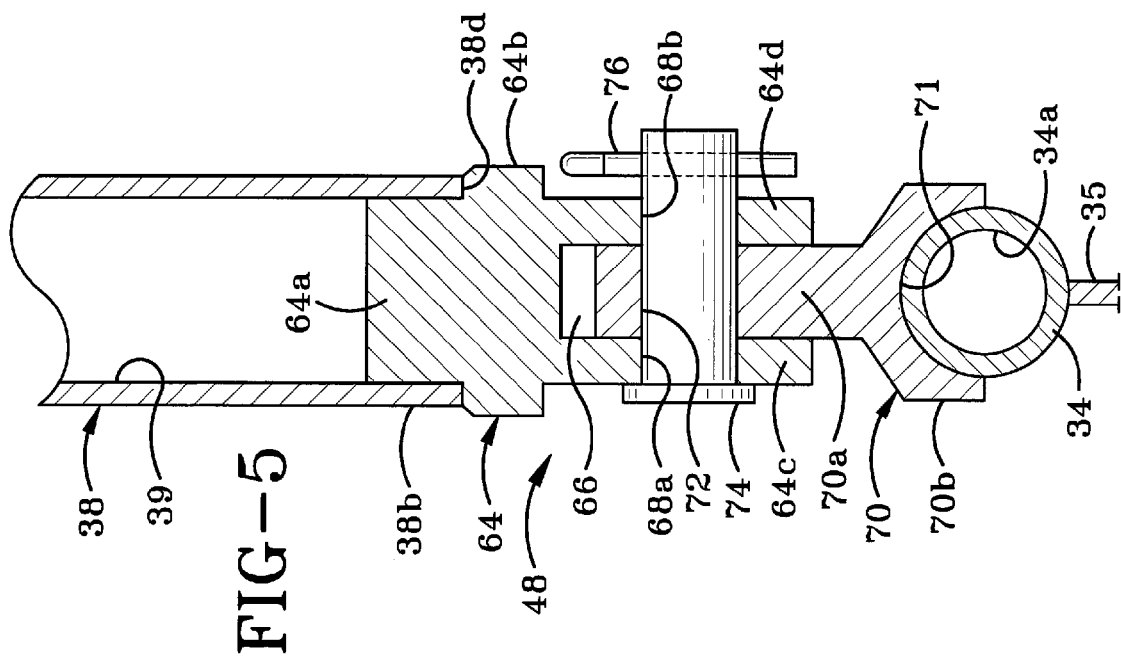
FIG-7
FIG-5

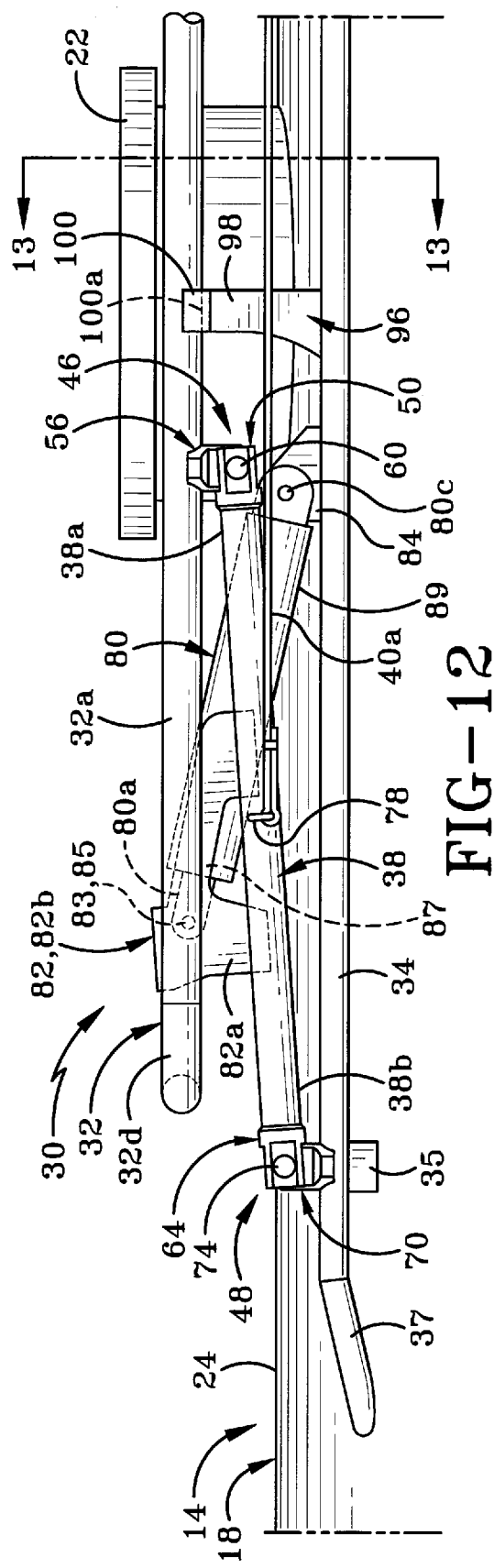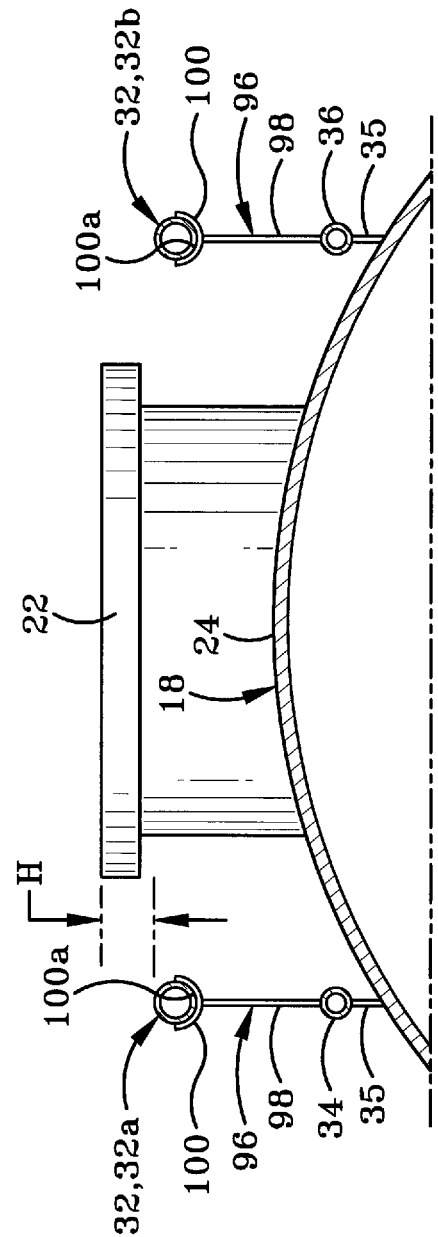

TANK TRAILER HAVING AN AIR ACTUATED HANDRAIL ASSEMBLY

TECHNICAL FIELD

This invention relates generally to trailers. More particularly, this invention relates to tank trailers. Specifically, this invention is directed to a tank trailer having an air actuated handrail assembly which aids in preventing operators from falling off the top wall of the tank trailer during filling and emptying operations and to a yoke assembly incorporated in the same.

BACKGROUND INFORMATION

Tank trailers are used in industry to transport a wide variety of products. Each trailer includes a large tank that has a plurality of fill ports on a top wall. When the tank is to be filled or to be emptied, the operator has to climb onto the top wall and walk along the same to open one or more of the fill ports. Some of the tank trailers that are currently in operation have relatively flat top walls but frequently these walls are fairly narrow for the operator to wall along. Additionally, if the operator has to open more than one fill port or a particular fill port, it is necessary for him or her to step over the fill ports. Since these ports are raised relative to the top wall, they present a tripping hazard for the operator. Since the top walls can be situated several feet off the road surface, there is a substantial risk for the operator to fall off the tank and seriously injure himself or herself. Yet other tank trailers have curved top walls and the curvature thereof makes it even more likely that the operator will fall.

There is therefore a need in the art for an improved tank trailer that reduces the possibility of an operator falling off the top wall of the same.

BRIEF SUMMARY OF THE INVENTION

The device of the present invention comprises a tank trailer having an air actuated handrail assembly provided thereon for safety of the operator as they walk along the top wall of the tank. The handrail assembly includes a top rail, a plurality of vertical members, a safety wire and, in most instances, a bottom rail. A plurality of yoke assemblies form part of the handrail assembly. Each yoke assembly secures one of the top and bottom ends of the vertical members to either of the top and bottom rails or to a mounting bracket on the tank. Each yoke assembly includes a base member engaged partially in a bore of the vertical member, and a cradle member engaged with an exterior wall of the top or bottom rails or mounting bracket. Base and cradle members are secured together by a pivot pin. Fluid-actuated cylinders extending between the vertical members and the tank move the handrail assembly between collapsed and expanded positions.

A first aspect of the invention is directed to a handrail assembly for a tank trailer, where the tank has a top wall extending longitudinally between a front end and a rear end of the trailer, and at least one fill port is disposed on the top wall. The handrail assembly comprises a top rail; a vertical member having a first end and a second end; a first yoke assembly which pivotally secures the first end of the vertical member to the top rail; a second yoke assembly secured to the second end of the vertical member and adapted to pivotally secure the vertical member to the tank; and a fluid cylinder having a first end and a second end, wherein the first end of the cylinder is pivotally engaged with the vertical member and the second end of the cylinder is adapted to pivotally engage the tank, and wherein said cylinder is operable to move the handrail assembly between a collapsed position and an expanded position, and when the handrail assembly is in the collapsed position the top rail is adapted to be disposed proximate the top wall of the tank, and when in the expanded position the top rail is adapted to be disposed a spaced distance vertically from the top wall of the tank.

A second aspect of the invention comprises in combination a tank trailer including a tank having a top wall extending longitudinally between a front end and a rear end thereof; at least one fill port disposed on the top wall of the tank and having access into an interior chamber within the tank; a plurality of stairs provided at the rear end of the tank, said stairs ascending from a bottom of the tank to the top wall thereof; and a stair handrail disposed along at least one side of the stairs. A handrail assembly is disposed on the top wall of the tank; and the handrail assembly comprises a top rail; a plurality of vertical members, each vertical member having a first end and a second end; a plurality of first yoke assemblies, each first yoke assembly pivotally securing the first end of one of the plurality of vertical members to the top rail; a plurality of second yoke assemblies, each second yoke assembly pivotally securing the second end of one of the plurality of vertical members to a region of the tank adjacent the top wall thereof; and at least three fluid cylinders, each fluid cylinder having a first end and a second end, wherein the first end of the cylinder is pivotally engaged with the vertical member and the second end of the cylinder is pivotally engaged with a portion of the tank, and wherein said cylinder is operable to move the handrail assembly between a collapsed position and an expanded position, and when the handrail assembly is in the collapsed position the top rail is disposed proximate the top wall of the tank, and when in the expanded position the top rail is disposed a spaced distance vertically from the top wall of the tank.

A third aspect of the invention is directed to a yoke assembly for securing a vertical rail to a horizontal rail in a collapsible handrail assembly. The yoke assembly comprises a base member having a first end, a second end and a peripheral wall extending therebetween, said base member having a longitudinal axis extending between said first and second ends, a first aperture defined in the peripheral wall and substantially at right angles to the longitudinal axis of the base member; and wherein said base member is adapted to be at least partially received within a bore of the vertical rail; a cradle member having a first end, a second end and sidewall extending therebetween; said cradle member further having a longitudinal axis that extends between the first and second ends thereof; and wherein the second end of the cradle member is adapted to engage an exterior region of a sidewall of the horizontal rail; a hole defined in the cradle member and being disposed substantially at right angles to the longitudinal axis thereof, said cradle member being selectively engageable with the base member such that the hole and the first aperture are aligned; and a pivot pin extending through the aligned first aperture and hole; said pivot pin securing the base and cradle members together and permitting them to pivot relative to each other about an axis disposed at right angles to the longitudinal axes of the base and cradle members.

A fourth aspect of the invention is directed to a collapsible handrail assembly for use on a top region of a tank trailer. The handrail assembly comprises a first horizontal rail having a first end, a second end and a first exterior wall thereinbetween, said first horizontal rail having a first longitudinal axis that extends between the first and second ends thereof; a second horizontal rail having a first end, a second end and a second exterior wall thereinbetween, said second horizontal rail having a second longitudinal axis that extends between the first and second ends thereof; a vertical rail having a first end, a second end and a sidewall extending therebetween, said vertical rail having a third longitudinal axis that extends between the first and second ends thereof, and wherein a longitudinal bore is defined in the vertical rail; a first yoke assembly engaged with the first end of the vertical rail and a portion of the first exterior wall of the first horizontal rail such that the vertical rail is able to pivot relative to the first horizontal rail about a first axis disposed at right angles to the third longitudinal axis; and a second yoke assembly engaged with the second end of the vertical rail and a portion of the second exterior wall of the second horizontal rail such that the vertical rail is able to pivot relative to the second horizontal rail and about a second axis disposed at right angles to the third longitudinal axis.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 5 is a cross-sectional rear view of the second yoke assembly taken through line 5-5 of FIG. 4;

FIG. 7 is a cross-sectional rear view of the first yoke assembly taken through line 7-7 of FIG. 6;

FIG. 12 is a side view of the section of tank trailer and hand assembly of FIG. 3 shown in a fully collapsed position;

FIG. 13 is a rear view of the fill port and support assembly taken through line 13-13 of FIG. 12 and showing the top rail disposed in the support member of the support assembly;

Similar numbers refer to similar parts throughout the drawings.

DETAILED DESCRIPTION OF THE INVENTION

Figure 1:
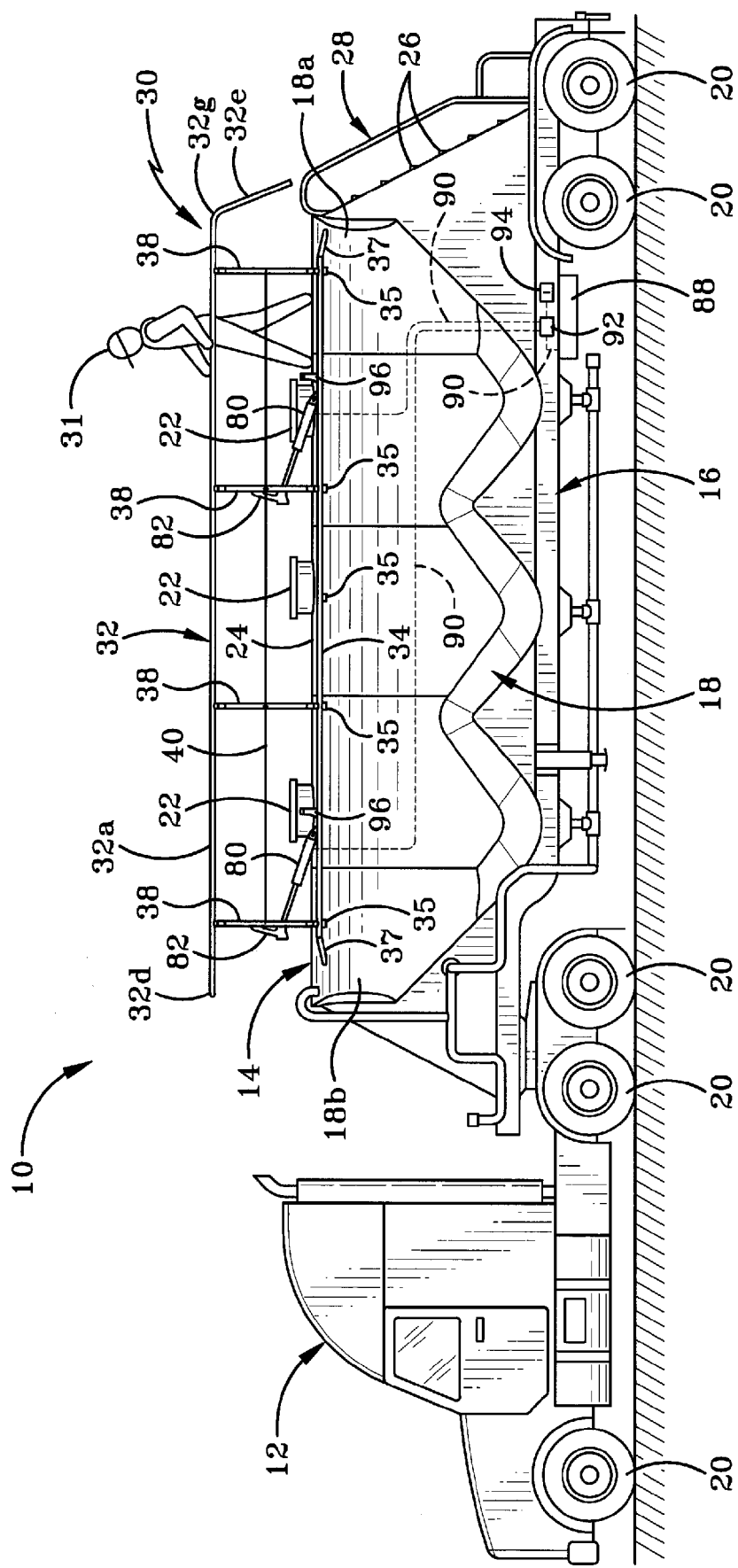
FIG. 1 is a side elevational view of a tank trailer incorporating a first embodiment of an air actuated handrail assembly in accordance with the present invention.

Referring to FIGS. 1-18, there is shown a bulk transport vehicle 10 comprising a tractor 12 and a tank trailer 14 in accordance with the present invention. Tank trailer 14 includes a base 16, a tank 18, and a plurality of wheels 20 mounted to base 16. Tank 18 has a rear end 18a and a front end 18b and a curved top wall 24 extending between them. Tank 18 further includes a longitudinal axis that extends between rear end 18a and front end 18b. A plurality of fill ports 22 is provided on top wall 24 of tank 18 to provide access to a chamber (not shown) in the interior of tank 18. Fill ports 22 are longitudinally aligned and are spaced at intervals from each other along top wall 24. A plurality of stairs 26 is provided on rear end 18a of tank 18 and a stair handrail 28 is provided adjacent stairs 26. Although not illustrated herein, stair handrail 28 preferably includes first and second handrail sections that are disposed on either side of stairs 26. It will be understood, however, that stair handrail 28 may comprise only a single handrail section that is disposed along one side of stairs 26. When it is necessary for the operator 31 to open fill ports 22, he or she climbs up stairs 26 and onto top wall 24 of tank 18. Operator 31 will walk along top wall 24 from adjacent rear end 18a of tank 18 toward front end 18b thereof, stepping over each of the fill ports 22 as necessary.

Figure 14:
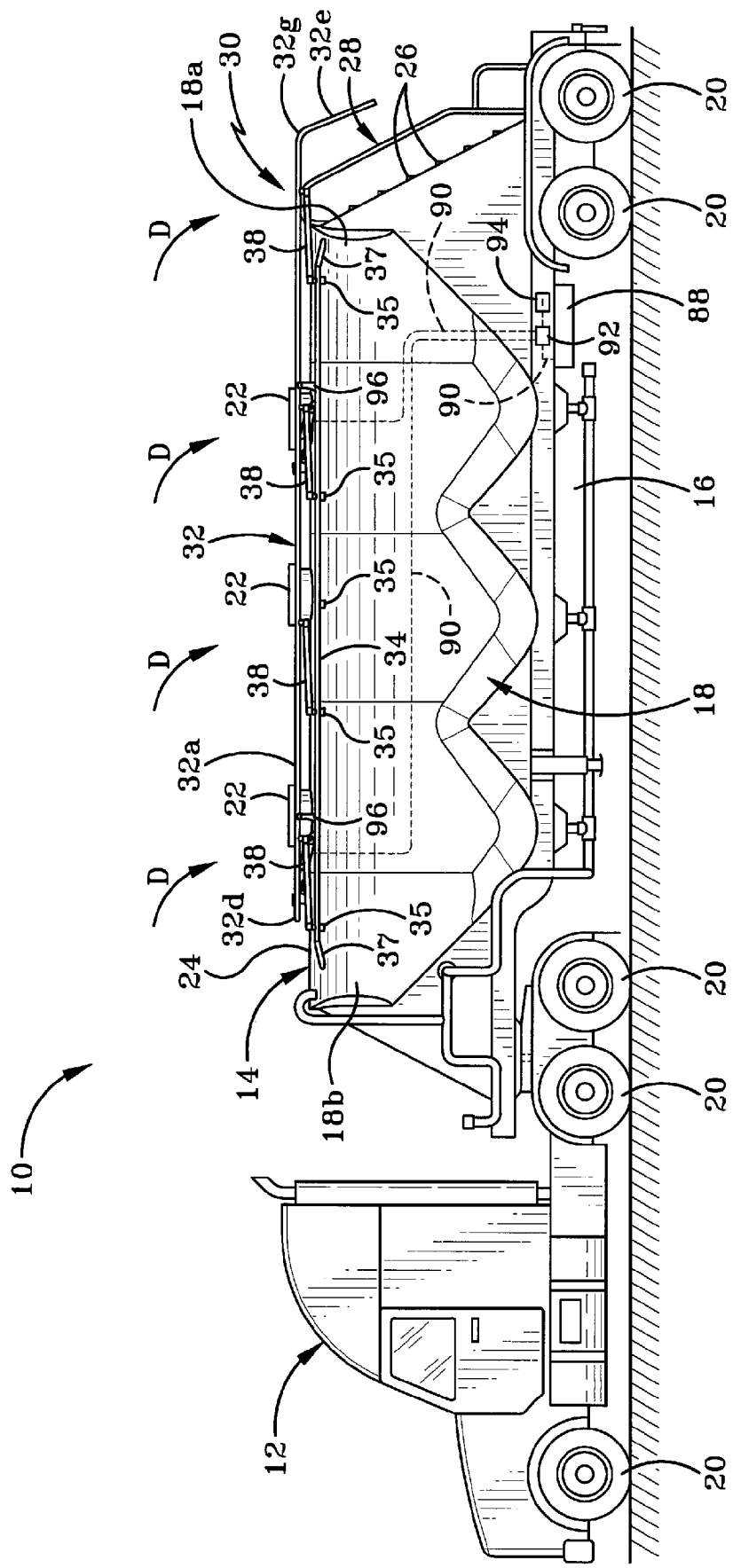
FIG. 14 is a side view of the tank trailer showing the handrail assembly in the fully collapsed position.

In accordance with a specific feature of the present invention, a first embodiment of a collapsible handrail assembly 30 in accordance with the present invention is provided on tank 18. Handrail assembly 30 is provided so that operator 31 is able to walk along the top wall 24 in relative safety. Handrail assembly 30 is movable between an expanded position (FIG. 1) where it may be used by operator 31 to move safely along top wall 24 of tank 18, and a collapsed position (FIG. 14). When in the collapsed position, handrail assembly 30 is in disposed in close proximity to top wall 24 and is no longer available for use by operator 31. Preferably, when in the collapsed position, top rail 32 is disposed a distance "H" (FIG. 13) beneath the top surface of fill ports 22. Handrail assembly 30 is intended to be in the collapsed position when vehicle 10 is moving.

In accordance with a specific feature of the present invention, handrail assembly 30 preferably comprises a top rail 32 and a plurality of vertical members 38 that extend between top rail 32 and top wall 24 of tank 18. Still further, handrail assembly preferably also includes one or more safety wires 40 that are secured between adjacent vertical members 38 and are disposed between top rail 32 and top wall 24. Handrail assembly 30 also includes at least one fluid cylinder 80 disposed between one of the vertical members 38 and top wall 24. Fluid cylinder 80 is actuated to move handrail assembly 30 between the expanded and collapsed positions. Cylinder 80 may be a pneumatic or gas cylinder, or it may be a hydraulic cylinder. Preferably, there are three or more gas cylinders provided to move handrail assembly 30 between the expanded and collapsed positions. Handrail assembly 30 preferably also includes bottom rails 34, 36 and the vertical members 38 extend between top rail 32 and bottom rails 34, 36 and the cylinder 80 extends between one of bottom rails 34, 36 and one of vertical members 38. Handrail assembly 30 further comprises a plurality of support assemblies 96 which support top rail 32 when handrail assembly 30 is in the collapsed position, as will be further described herein.

In accordance with a specific feature of the present invention, top rail 32 comprises a linear, elongate first top section 32a that extends from proximate rear end 18a of tank to proximate front end 18b of tank. Top rail 32 has a longitudinal axis "Y" that is disposed substantially parallel to the longitudinal axis of tank 18. Tank 18 further includes a first sidewall 18c of tank and an opposed second sidewall (not numbered). The first sidewall 18c and second sidewall extend downwardly from opposite sides of top wall 24. First top section 32a is disposed so that is it adjacent first sidewall 18c of tank. Top rail 32 may further comprise a linear, elongate second top section 32b that extends from proximate rear end 18a of tank 18 to proximate front end 18b thereof. Second top section 32b is spaced a distance laterally from first top section 32a and is disposed substantially parallel thereto and proximate the second sidewall of tank 18. Second top section 32b also has a longitudinal axis (not shown) that is substantially parallel to the longitudinal axis "Y" of first top section 32b.

Preferably, top rail 32 further comprises a connector section 32c that extends between a first end of first top section 32a and a first end of second top section 32b. Connector section 32c is disposed substantially parallel to a lateral axis "X" disposed substantially at right angles to the longitudinal axis "Y" of first top section 32a and proximate front end 18b of tank 18. A corner section 32d is provided to join connector section 32c with each first end of the first and second top sections 32a, 32b. Corner sections 32 preferably are rounded so as to guide air flow around handrail assembly 30 when vehicle 10 is moving, thereby making handrail assembly more aerodynamic.

Figure 2:
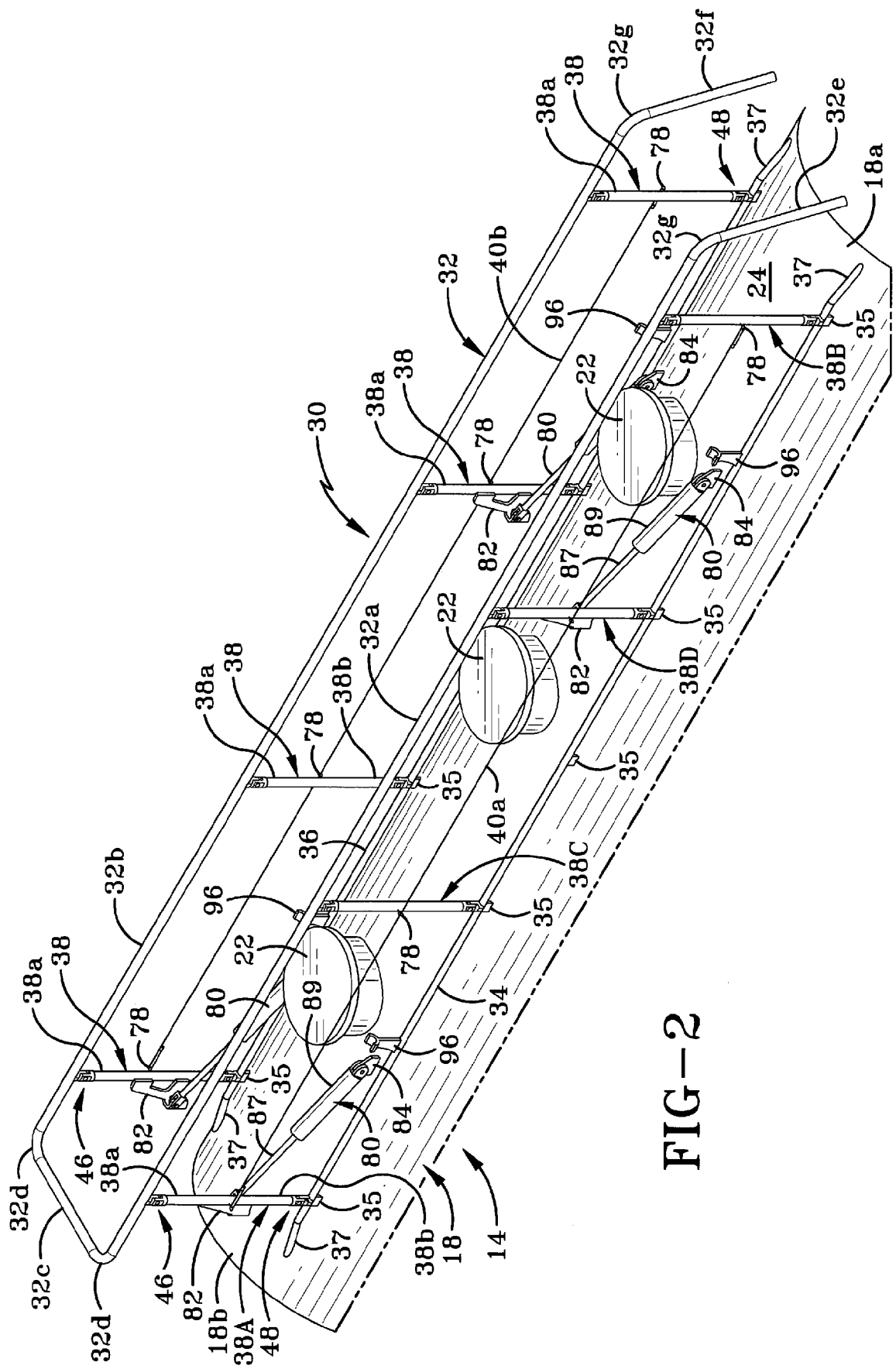
FIG. 2 is a top perspective view of the handrail assembly shown in the expanded position on a top wall of the tank trailer.
Figure 3:
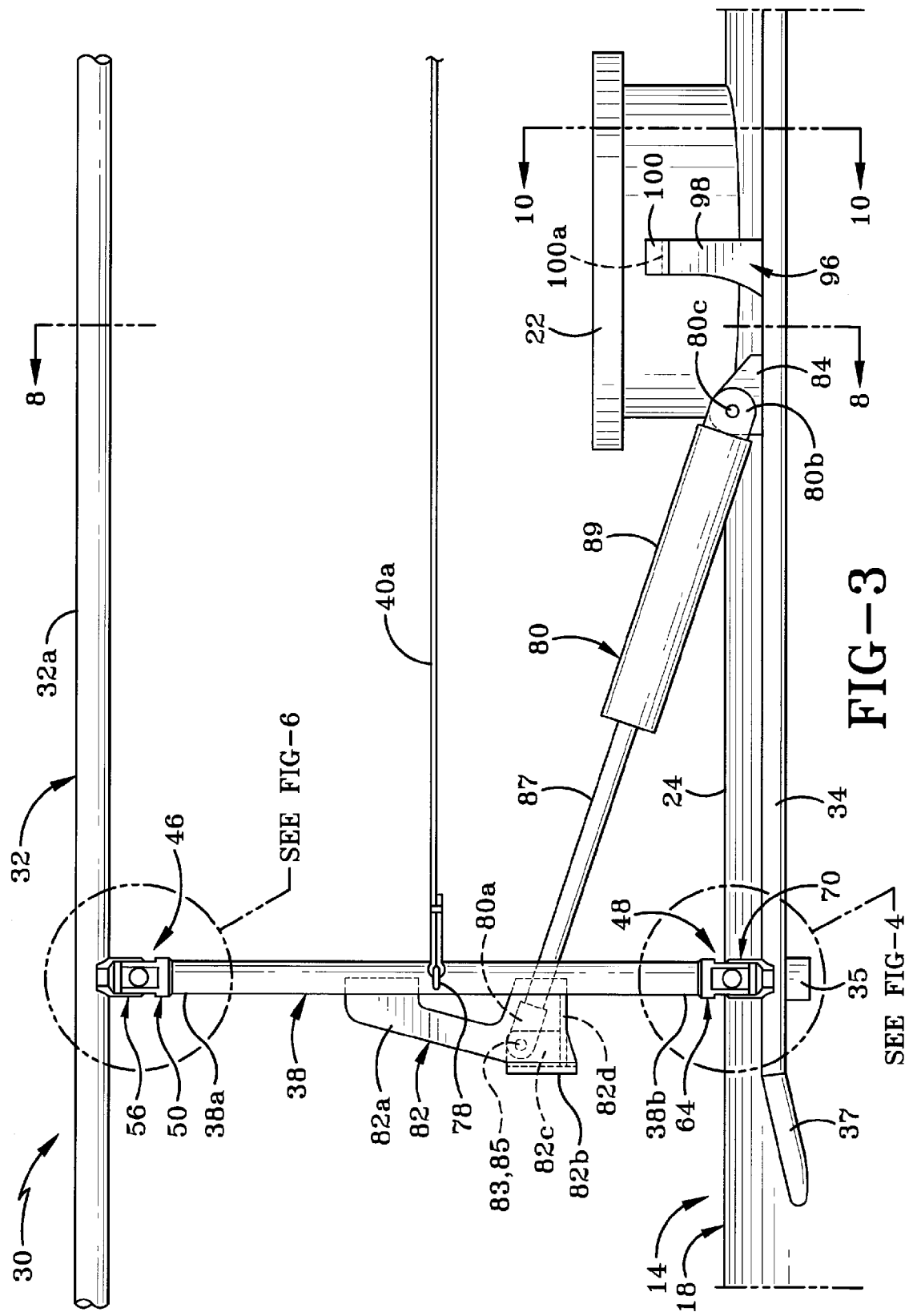
FIG. 3 is a side view of a section of the tank trailer and handrail assembly, when the handrail assembly is in the expanded position.

Top rail 32 further comprises a first end section 32e which extends outwardly and downwardly from a second end of first top section 32a and a second end section 32f which extends outwardly and downwardly from a second end of second top section 32b. Again, the corners 32g where first and second end sections 32e, 32f are joined to first and second top sections 32a, 32b are rounded to make handrail assembly 30 more aerodynamic. The rounded corners 32g also reduce the possibility that operator 31 will injure themselves on that section of handrail assembly 30 as they climb up stairs 26. First and second top sections 32a, 32b and connector section 32c preferably are all disposed in the same plane. First and second end sections 32e, 32f, on the other hand, angle downwardly from first and second top sections 32a, 32b at an angle of about 45 degrees relative to the plane in which first and second top sections 32a, 32b are disposed. First and second end sections 32e, 32f substantially bridge the entire gap between first and second top sections 32a, 32b and stair handrail 28 when handrail assembly 30 is in the expanded position (FIGS. 1 & 2). Thus, operator 31 always has a portion of one or the other of the top rail 32 or stair handrail 28 to grasp when moving upwardly on stairs 26 or on top wall 24. When handrail assembly 30 is in the collapsed position, then first and second end sections 32e, 32f are disposed alongside the railing sections of stair handrail 28 as shown in FIG. 14.

Each of the first and second top sections 32a, 32b, connector section 32c, and first and second end sections 32e, 32f preferably are all hollow tubular members that preferably are circular in cross-sectional shape and define an interior bore 32h (FIG. 7) therein. It will be understood that other cross-sectional shapes may be utilized instead without departing from the scope of the present invention. It will further be understood that all of these members may, alternatively, be solid instead of hollow.

In accordance with yet another feature of the present invention, handrail assembly 30 preferably also includes a linear, elongate first bottom rail 34 that extends from proximate rear end 18a of tank 18 to proximate front end 18b thereof and proximate one side of top wall 24. First bottom rail 34 is disposed substantially parallel to the longitudinal axis "Y" of first top section 32a. First bottom rail 34 may be aligned with first top section 32a or may be offset laterally relative thereto. Handrail assembly 30 preferably further includes a second bottom rail 36 that extends from proximate rear end 18a of tank 18 to proximate front end 18b thereof and proximate the other side of top wall 24. Second bottom rail 36 is generally parallel to the longitudinal axis "Y" of first top section 32a and is laterally spaced from first bottom rail 34. Second bottom rail 36 may be aligned with second top section 32b or may be laterally offset relative thereto. Although not illustrated herein, it will be understood that the bottom rail may further include a connector section that extends between the first end of first bottom rail 34 and the first end of second bottom rail 36 and which is generally aligned with connector section 32c. Obviously, in this instance, the bottom rail would be a generally U-shaped member that is substantially aligned with the U-shaped top rail 32.

Figure 4:
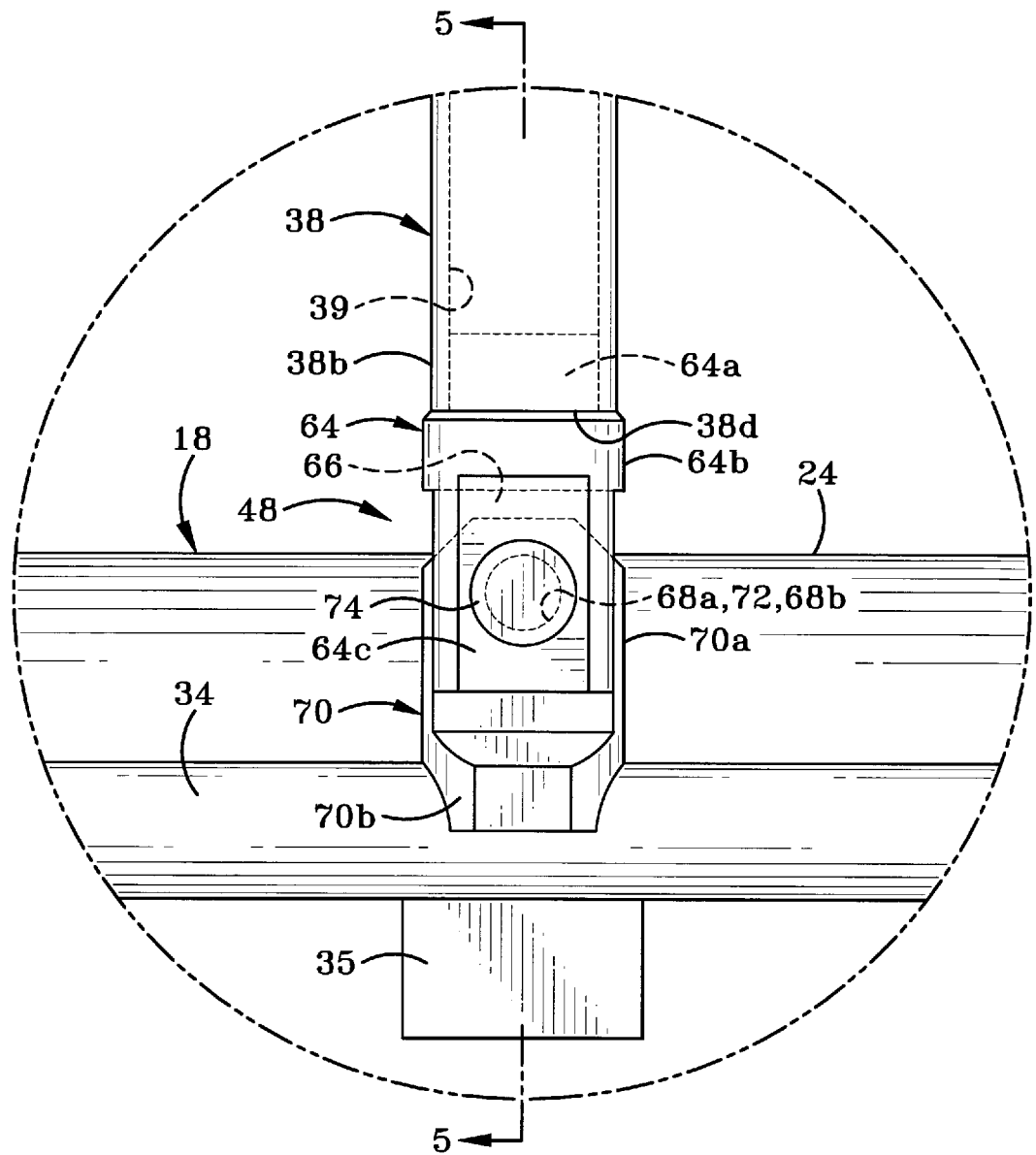
FIG. 4 is an enlarged side view of a second yoke assembly shown in a first highlighted region of FIG. 3.
Figure 6:
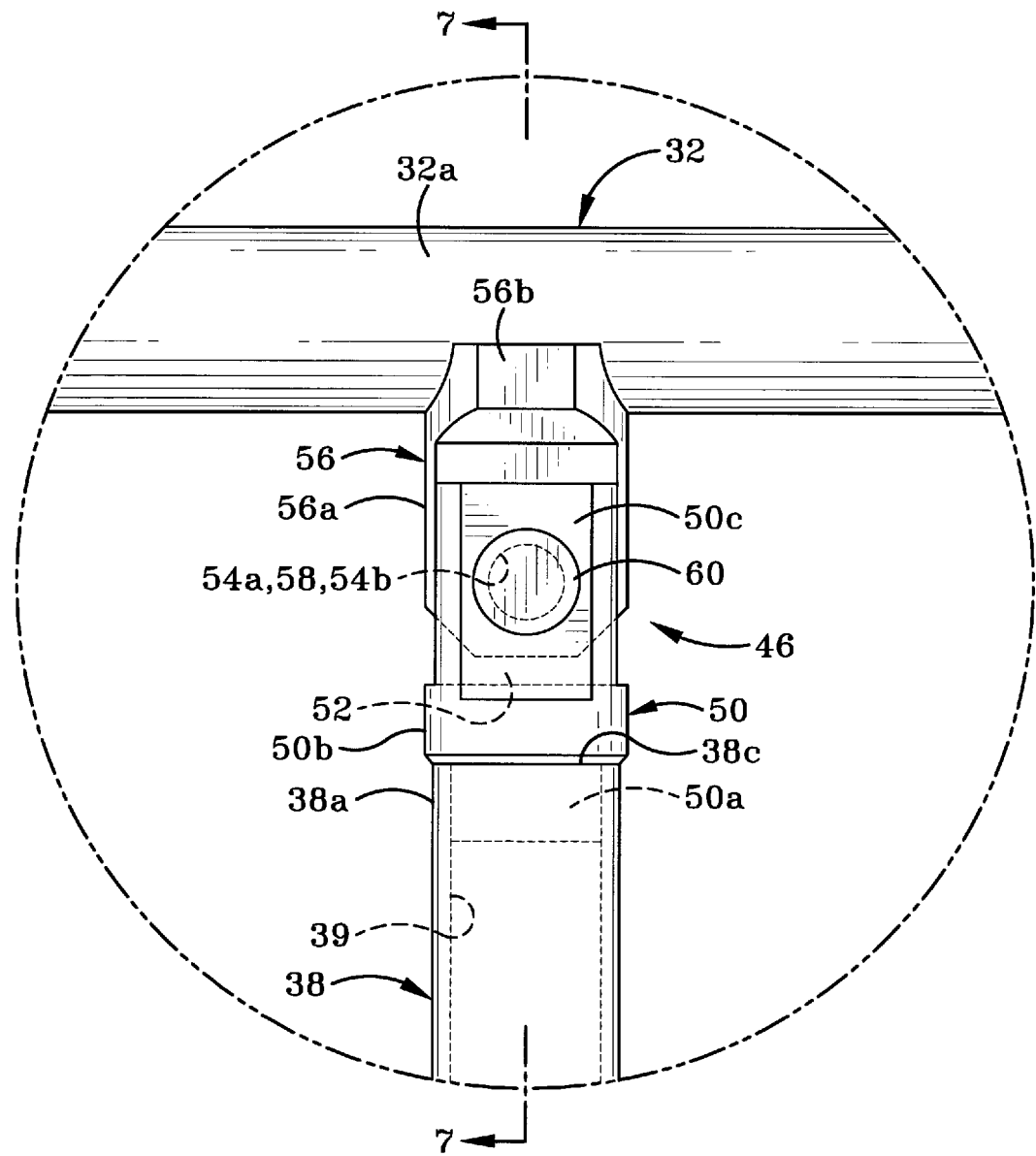
FIG. 6 is an enlarged side view of a first yoke assembly shown in a second highlighted region of FIG. 3.

Referring to FIGS. 2 & 4, each of first and second bottom rails 34, 36 is preferably secured to a plurality of mounts 35. Each mount 35 comprises a block of metal or other material that is welded or otherwise secured to top wall 24 or to an upper end of one of the side walls of tank 18. First and second bottom rails 34, 36 are welded or otherwise secured to each mount 35. Front and rear ends 37 of both first and second bottom rails 34, 36 preferably angle downwardly toward the exterior surface of tank 18 and are welded or otherwise secured thereto. Preferably, bottom rails 34, 36 are elongate, hollow, tubular members that are generally circular in cross-sectional shape and define a bore 41 (FIG. 5) therein. It will be understood, however, that other cross-sectional shape bottom rails may be used without departing from the scope of the present invention and the bottom rails may be solid instead of hollow.

In accordance with another specific feature of the present invention, each of the plurality of vertical members 38 is pivotally secured between top rail 32 and one of bottom rails 34, 36. Each vertical member 38 is an elongate, hollow tube which has a first end 38a and a second end 38b and defines a bore 39 therein. A plurality of first and second yoke assemblies 46, 48 are provided to secure vertical members 38 to top rail 32 and first and second bottom rails 34, 36. Each first yoke assembly 46 is provided to secure first end 38a of each vertical member 38 to top rail 32. Each second yoke assembly 48 is provided to secure second end 38b of each vertical member 38 to one of first and second bottom rails 34, 36. It will be understood, however, that second yoke assembly 48 may be secured to a mounting block that is welded to tank 18 instead of being secured to one of bottom rails 34, 36.

Referring to FIGS. 4-7, first and second yoke assemblies, 46, 48 are shown in greater detail. First and second yoke assemblies 46, 48 are substantially identical to each other and function in the same manner. First yoke assembly 46 comprises a base member 50 and a cradle member 56. Base member 50 has a first end 61, a second end 50c, 50d and a peripheral wall 63 extending therebetween. Base member 50 also has a longitudinal axis "Y" extending between first and second ends 61, 50c, and 50d. Base member 50 specifically includes a first region 50a having a first diameter "D1" which is complementary to that of bore 39 of vertical member 38. First region 50a is received in bore 39 and may be retained therein by friction or may be welded or otherwise secured to the interior surface of first end 38a of vertical member 38. Base member 50 further comprises an annular second region 50b that is continuous with first region 50a and has a second diameter "D2" which is greater than that of bore 39 and therefore cannot be received therein. A portion of second region 50b abuts the uppermost edge 38c of vertical member 38. Base member 50 further includes at least one, and preferably two arms 50c, 50d. Each arm 50c, 50d is continuous with second region 50b and is disposed generally parallel to each other and to longitudinal axis "Y". Arm 50c is spaced laterally away from arm 50d such that a gap 52 is defined therebetween. A first aperture 54a is defined in first arm 50c and a second aperture 54b is defined in second arm 50d. Each of the first and second apertures 54a, 54b is disposed substantially at right angles to longitudinal axis "Y" and the apertures are aligned with each other and are aligned with a horizontal axis "X".

Cradle member 56 has a first end 67, a second end 69 and sidewall 73 extending therebetween. Cradle member 56 further has a longitudinal axis that is also represented by the reference character "Y" in FIG. 7. The longitudinal axis "Y" extends between first and second ends 67, 69 of cradle member 56. Cradle member 56 is a generally Y-shaped member when viewed in cross-section (such as in FIG. 7) and includes a stem 56a and a rest 56b. Rest 56b includes a face 57 which is complementary to a portion of the exterior wall of top rail 32 and is designed to be fixedly secured thereto such as by welding on any other suitable securement method. In the preferred embodiment of the invention, face 57 is curved in a manner that is complementary to the curved exterior wall of top rail. 32. If, however, top rail 32 is of a different cross-sectional shape, then rest 56b will include a face that is complementary to that different cross-sectional shape.

Stem 56a is complementary configured to be received into gap 52 of base member 50. A hole 58 is defined through stem 56a and is oriented substantially at right angles to longitudinal axis "Y" and therefore parallel to axis "X" in base member 50. Hole 58 is selectively alignable with apertures 54a, 54b in base member 50. A pin 60 is receivable through the aligned apertures 54a, 54b and hole 58. Pin 60 is therefore aligned along horizontal axis "X" and base member 50 and cradle member 56 are rotatable about axis "X" and relative to each other.

In accordance with yet another feature of the present invention, a locking mechanism is provided to secure pin 60 in the aligned apertures 54a, 54b and hole 58 and to prevent the pin's withdrawal from the same. One suitable form of this locking mechanism is the cotter pin 62 which is inserted through a slot (not numbered) in pin 60.

First yoke assembly 46 secures top rail 32 to vertical member 38 in a manner that enables vertical member 38 to pivot about pin 60 relative to top rail 32. Vertical member 38 therefore pivots about axis "X" and substantially at right angles to longitudinal axis "Y".

Referring to FIG. 5, second yoke assembly 48 is shown in greater detail. Second yoke assembly 48 is substantially identical to first yoke assembly 46 and functions in the same manner. Second yoke assembly 48 comprises a base member 64 and a cradle member 70. Base member 64 includes a first region 64a having a diameter complementary to bore 39 of vertical member 38. Base member 64 further comprises an annular second region 64b that is of a diameter greater than that of bore 39. Thus, first region 64a is received in bore 39 at second end 38 of vertical member 38 and second region 64b abuts the lowermost edge 38d of vertical member 38. First and second arms 64c, 64d extend downwardly and outwardly away from second region 64b and in the opposite direction to first region 64a. First arm 64c is spaced laterally away from second arm 64d such that a gap 66 is defined therebetween. Arms 64c and 64d are parallel to each other and are substantially parallel to a longitudinal axis "Y" that extends through base member 64 and vertical member 38. A pair of aligned apertures 68a, 68b is defined through arms 64c, 64d, respectively and these apertures are disposed substantially at right angles to longitudinal axis "Y" and are aligned along a horizontal axis "X".

Cradle member 70 of second yoke assembly 48 is generally Y-shaped in cross-sectional shape and is welded or otherwise secured to a portion of the exterior walls of one or the other of bottom rails 34, 36. As illustrated, cradle member 70 includes a stem 70a and a rest 70b. Rest 70b includes a face 71 that is complementary to a portion of the exterior wall of bottom rail 34 and is welded or otherwise secured thereto. In particular, face 71 is curved and complementary to a curved portion of the exterior wall of bottom rail 34 but other complementary shaped faces and bottom rails are considered to be in the scope of the present invention. Stem 70a is complementary configured to be received into gap 66 of base member 64 and to be disposed substantially parallel to longitudinal axis "Y" when second yoke assembly 48 secures vertical member 38 to bottom rail 34. A hole 72 is defined through stem 70a and, when aligned with first and second apertures 68a, 68b in base member 64, hole 72 is disposed parallel to axis "X" and at right angles to longitudinal axis "Y". Aligned hole 72 and apertures 68a, 68b receive a pin 74 therethrough and a cotter pin 76 or other connector is engageable with pin 74 to lock the same against withdrawal from the aligned apertures and hole 68a, 68b, 72. Second yoke assembly 48 secures bottom end 38b of vertical member 38 to bottom rail 34 or 36 in a manner that permits vertical member to pivot about pin 74 relative to bottom rail 34. Additionally, pin 74 enables base member 64 and cradle member 70 of second yoke assembly 48 to pivot about axis "X" relative to each other.

It will be understood that since vertical members 38 extend downwardly from top rail 32 on both sides of top wall, and first and second yoke assemblies 46, 48 are secured to each of the vertical members 38, when handrail assembly 30 is actuated, the pivotal motion of all of the yoke assemblies occurs substantially simultaneously and in unison. Additionally, as will be evident from the drawings, the pivotal motion of vertical member 38 relative to top rail 32 is in an opposite direction to the pivotal motion of vertical member 38 relative to bottom rail 34 or 36 when handrail assembly is moved from the expanded position to the collapsed position. Additionally, the direction of rotational motion is reversed when handrail assembly 30 is moved from the collapsed position to the expanded position. Although not illustrated herein, each yoke assembly 46, 48 may include components, such as stops, that limit the extent of rotational motion in any particular direction.

Figure 9:
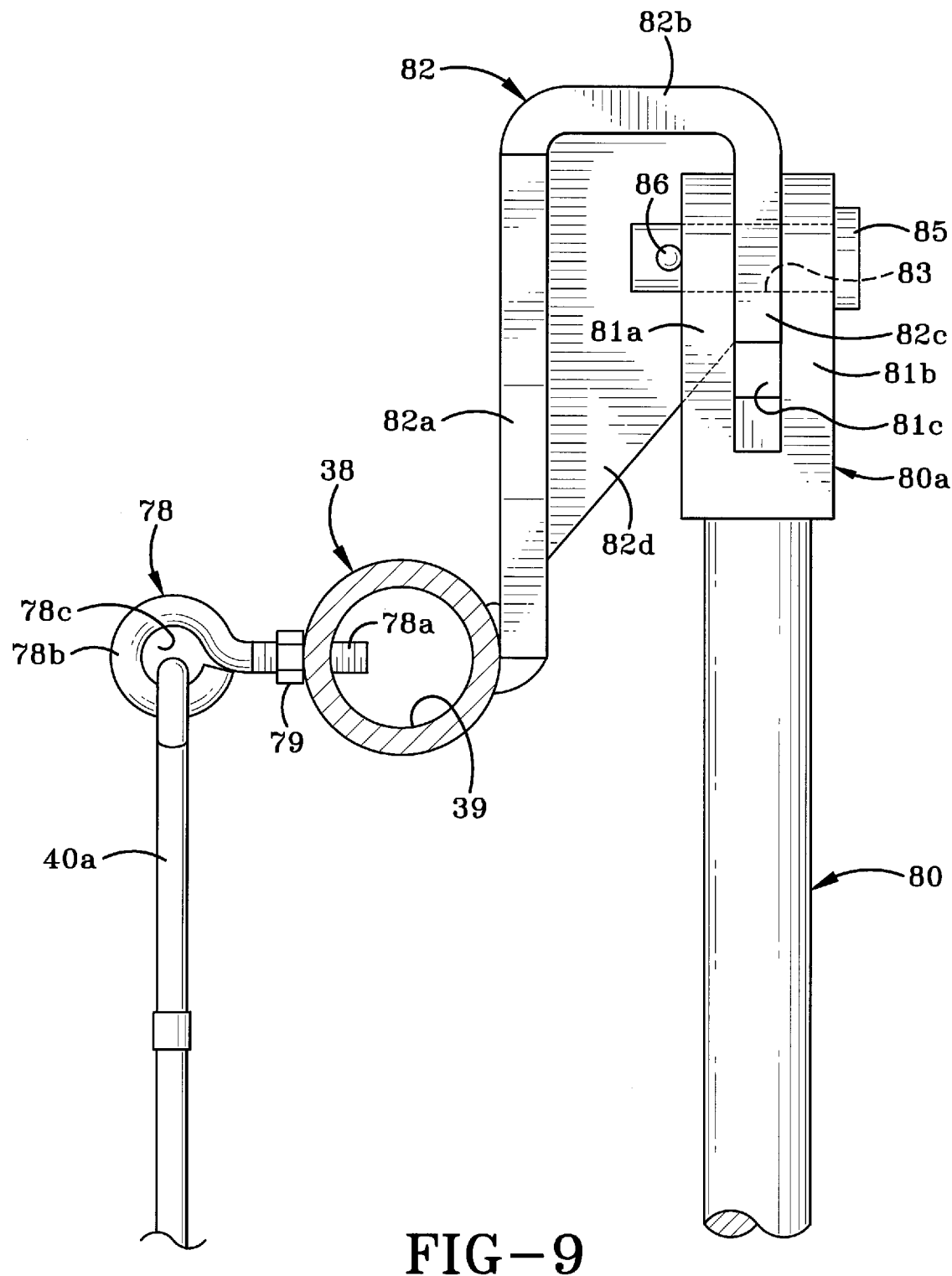
FIG. 9 is a top view of the first end of the cylinder and the mounting bracket taken through line 9-9 of FIG. 3.

In accordance with yet another feature of the present invention, handrail assembly 30 includes a first length 40a and a second length 40b of safety wire 40a (FIG. 2). First length 40a is disposed between first top section 32a of top rail 32 and bottom rail 34 and the second length 40b is disposed between second top section 32b of top rail 32 and bottom rail 36. First top section 32a, first length 40a and bottom rail 34 preferably are generally aligned with each other in a vertical plane. Similarly, second top section 32b, second length 40b and bottom rail 36 preferably are generally aligned with each other in a vertical plane. First length 40a is engaged at a first end with an eyelet 78 which extends outwardly at right angles from a side wall of a first vertical member 38A (FIGS. 2&9). Eyelet 78 includes a threaded shaft 78a (FIG. 9) and a circular head 78b which defines an aperture 78c therein through which safety wire 40a is inserted and then crimped or otherwise secured back onto itself. Shaft 78a is threaded through a hole (not shown) in the wall of vertical member 38 and into bore 39 thereof. A nut 79 locks eyelet 78 in place. First end vertical member 38A and all the vertical members 38 connected to bottom rail 34 are generally aligned in the same vertical plane as first top section 32a, first length 40a and bottom wall 34. First length 40a of safety wire 40 passes through eyelets 78 that extend outwardly from side walls of intermediate vertical members 38C, 38D, and a second end of first length 40a is secured to an eyelet 78 on a second end vertical member 38B. Second length 40b of safety wire 40 is similarly connected to the vertical members 38 which are secured via second brackets 48 to bottom rail 36. When handrail assembly 30 is in both of the expanded and the collapsed positions, first and second lengths 40a, 40b of safety wires 40 are held relatively taut between first and second vertical members 38A, 38B. It will be understood that more than one safety wire 40 may be disposed between top rail 32 and bottom rails 34, 36 without departing from the scope of the invention.

As indicated previously and in accordance with yet another feature of the present invention, at least one, and preferably four, air-actuated cylinders 80 are provided and collapse handrail assembly 30. Preferably, two cylinders 80 are disposed proximate rear end 18a of tank 18 and two cylinders 80 are provided proximate front end 18b of tank 18. Additionally, each of the two cylinders 80 near either of the rear end 18a or front end 18b of tank 18 are disposed on opposite sides of tank 18 from each other. This ensures that handrail assembly 30 is moved smoothly and evenly between the expanded and collapsed positions. Each cylinder 80 has a first end 80a and a second end 80b. A first mounting bracket 82 secures first end 80a of cylinder 80 to one of vertical members 38. A second mounting bracket 84 secures second end 80b of cylinder 80 to top wall 24 of tank 18. FIGS. 2 and 9 show how first mounting bracket 82 is secured to first end of cylinder 80 in greater detail. First end 80a of cylinder 80 includes a housing having first and second arms that are 81a, 81b that are substantially parallel to each other and separated by a gap 81c. Although not specifically shown in FIG. 9, each of first and second arms 81a, 81b defines a hole disposed at right angles to the longitudinal axis of each arm.

Figure 8:
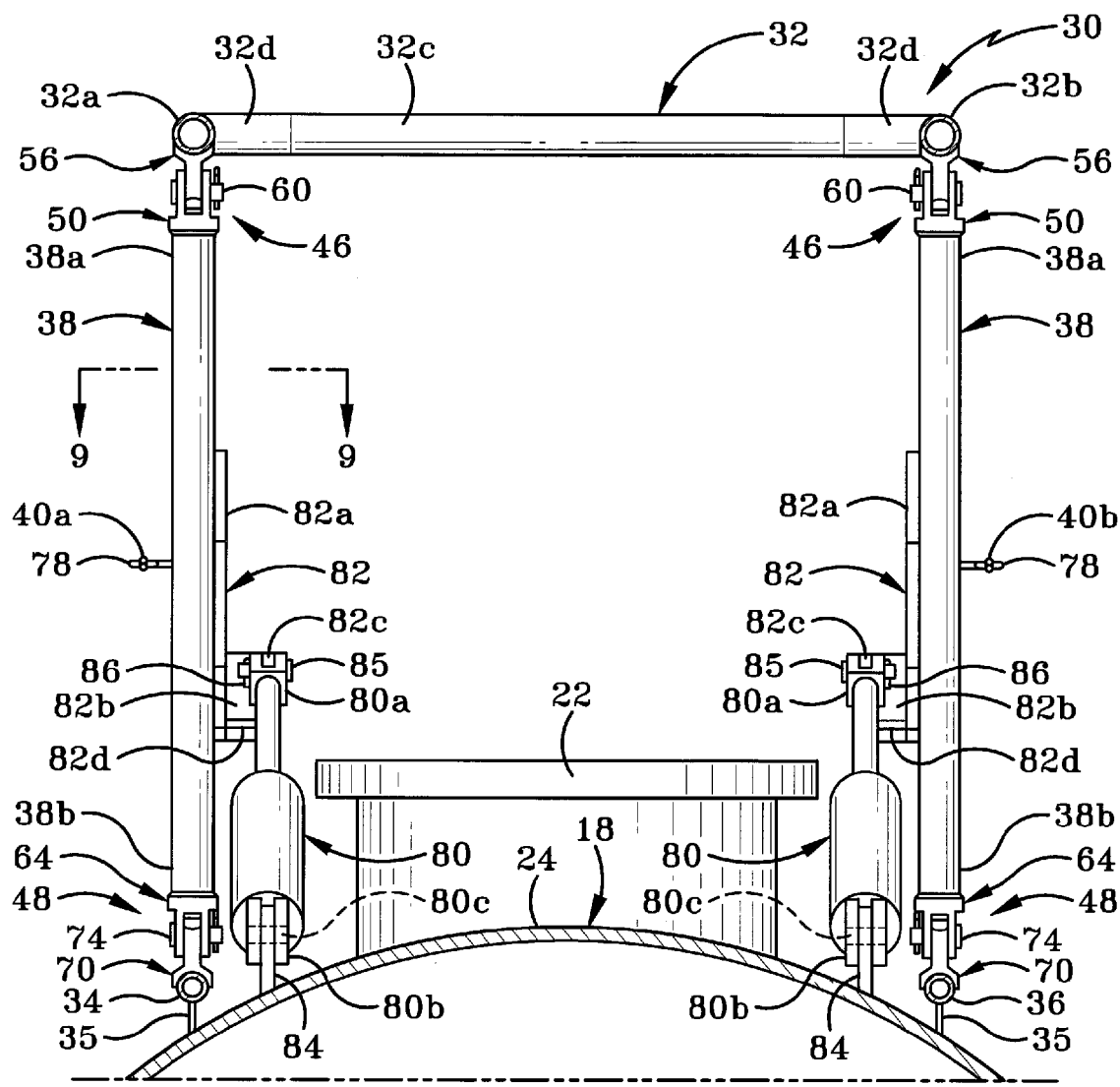
FIG. 8 is a rear view of the handrail assembly taken through line 8-8 of FIG. 3.
Figure 10:
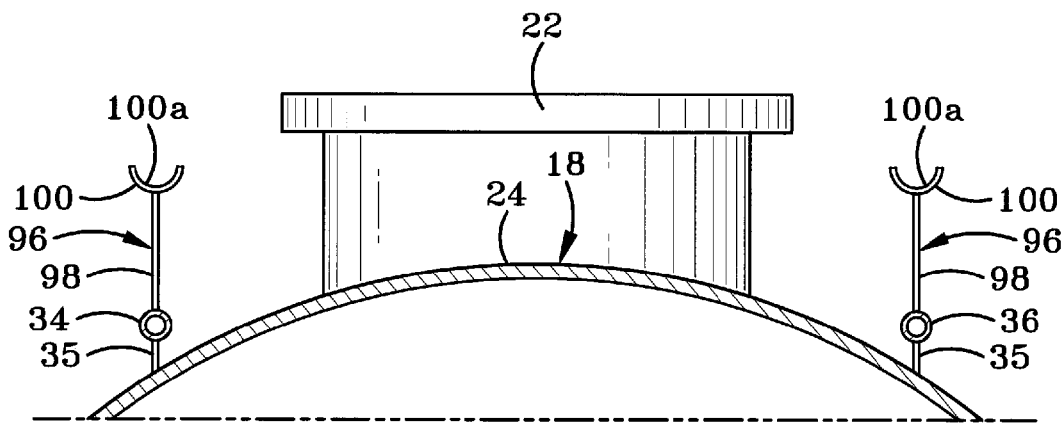
FIG. 10 is a rear view of the fill port and support assembly taken through line 10-10 of FIG. 3.

First mounting bracket 82 has a first region 82a that is welded or otherwise secured to a length of an exterior portion of the wall of vertical member 38. A second region 82b extends laterally outwardly from first region 82a as is best seen in FIGS. 8 and 9. Preferably, second region 82b is disposed at right angles to first region 82a. A third region 82c extends outwardly from second region 82b and preferably at right angles thereto. Third region 82c is generally parallel to first region 82a and extends in the same direction outwardly from second region 82b. At least a portion of third region 82c is sized to be received in gap 81c of first end 80a of cylinder 80. Third region 82c defines an aperture 83 that extends at right angles to the length of third region 82c and is alignable with the aligned holes in first end 80a of cylinder 80. A pin 85 extends through these aligned aperture 83 and holes and a cotter pin 86 is inserted through a channel in pin 85 to prevent disengagement of first end 80a and first mounting bracket 82. First mounting bracket 82 further includes a brace 82d which extends between first, second and third regions 82a, 82b, and 82c.

Second mounting bracket 84 may be of any shape that is suitable to secure second end 80b of cylinder 80 to tank 18. Second mounting bracket 84 defines a hole therein (not shown) that is alignable with a hole in second end 80b of cylinder 80 and a pin 80c is inserted through these aligned holes to secure cylinder 80 and second mounting bracket 84 together.

In accordance with yet another feature of the present invention, a fluid supply 88 is operationally connected to cylinders 80 via hoses 90. A controller 92 and switch 94 are operationally connected to fluid supply 88 to activate and deactivate the same. If cylinders 80 are pneumatic or air-actuated then fluid supply 88 is an air supply. If, on the other hand, cylinders 80 are hydraulic, then the fluid supply 88 is a reservoir of oil and some other suitable fluid.

In accordance with yet another feature of the present invention, a plurality of support assemblies 96 extend upwardly and outwardly from top wall 24 of tank 18. Support assemblies 96 are spaced a distance longitudinally away from each other along the length of top wall 24. Each support assembly 96 comprises a pedestal 98 and a support member 100. A first end of pedestal 98 may be directly welded to top wall 24 of tank 18 or, as shown in FIGS. 2 and 13, the first end thereof may be welded or otherwise secured to bottom rail 34 or 36. Support member 100 includes a face 100a that is complementary configured to receive a portion of the exterior wall of top rail 32 therein. Preferably, therefore, face 100a is curved and is complementary to the curved exterior wall of top rail 32. More specifically, face 100a of each support assembly 96 is substantially semi-circular in shape and the curved portion is configured and positioned to receive a portion of top rail 32 therein and to support the same when handrail assembly 30 is moved into the collapsed position.

Handrail assembly 30 is used in the following manner. When the vehicle 10 is to travel over the roads, handrail assembly 30 is in the collapsed position (FIG. 14). In this position, preferably, the top surfaces of fill ports 22 extend for at least a short distance above top rail 32. Top rail 32 is received in support member 100 of support assemblies 96 and is thereby supported a distance vertically above bottom rails 34, 36. Vertical members 38 angle between top and bottom rails 32, 34, 36 and portions thereof are in abutting contact with one or the other of top and bottom substantially parallel to and a short distance from stair handrail 38. Additionally, cylinders 80 are in the condition where piston rod 87 is substantially retained within the housing 89 of each cylinder 80. This is illustrated in FIG. 12.

Figure 11:
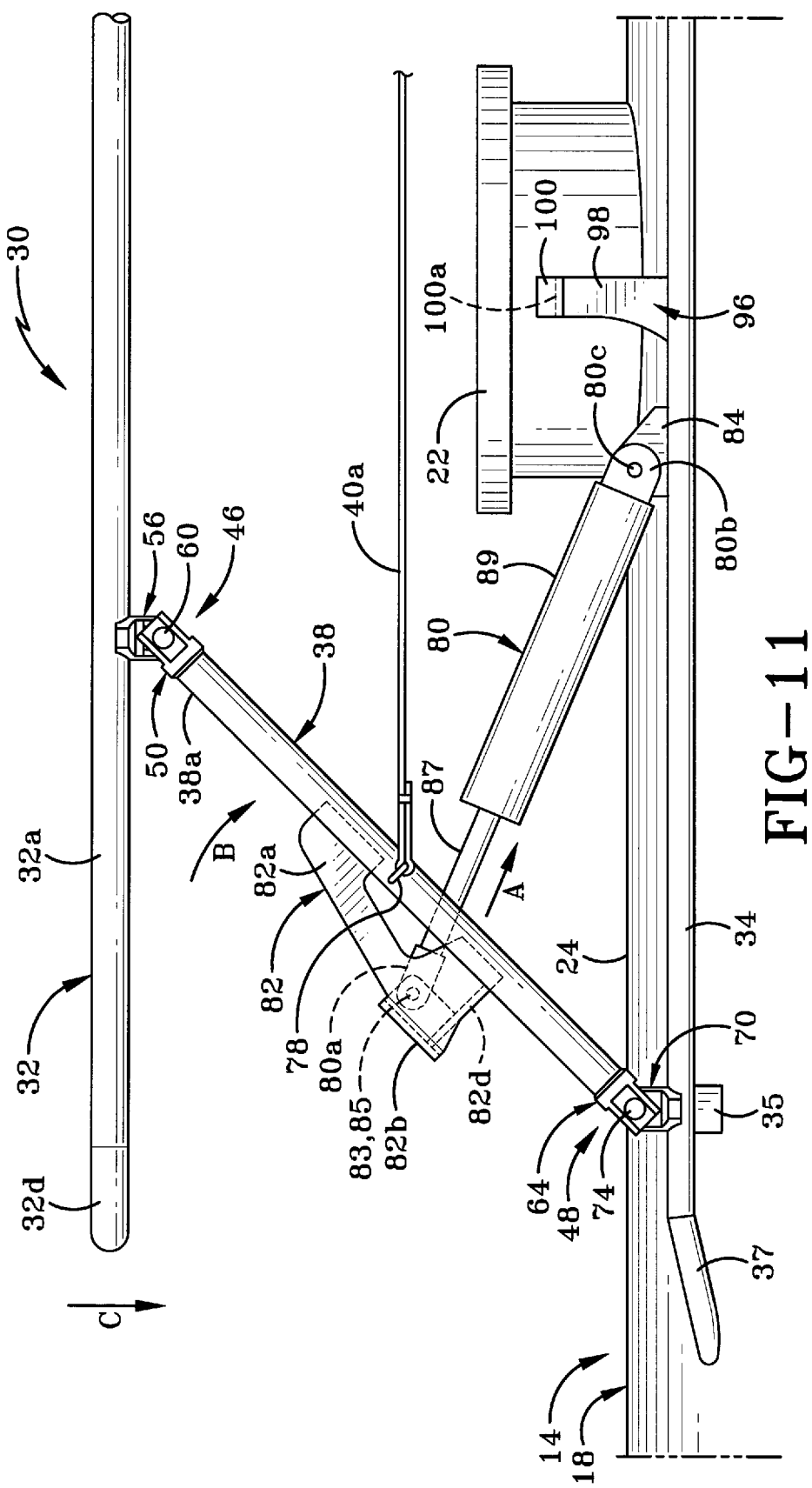
FIG. 11 is a side view of the section of the tank trailer and hand assembly of FIG. 3 shown in a partially collapsed position.

The operator engages controller 92 and switch 94 and this activates fluid supply 88. Fluid is pumped from fluid supply 88 through hoses 90 and into cylinders 80. The influx of air forces the piston rods 87 outwardly from the housings 89 thereof in the opposite direction to arrow "A" in FIG. 11. This overall lengthening of the various cylinders 80 occurs substantially simultaneously. As the piston rods 87 move outwardly from the housings 89, the vertical members 38 to which cylinders 80 are attached are caused to pivot about pins 74 of second yoke assemblies 48 and those vertical members 38 rotate upwardly in the opposite direction to arrow "B" (FIG. 11). The motion also causes rotation of vertical members 38 about pivot pins 60 in first yoke assemblies 46. The rotation of vertical members 38 causes top rail 32 to be raised vertically in the opposite direction to arrow "C" in FIG. 11, thus increasing the distance between top rail 32 and bottom rails 34, 36. The movement of top rail 32 also results in all of the other vertical members 38 connected thereto and which are not also connected to a cylinder 80 to be rotated into a substantially vertically position. When vertical members 38 are in a substantially vertical orientation and are disposed substantially at right angles to one or both of top rail 32 and bottom rails 34, 36, handrail assembly 30 is in the fully expanded position and is available for use by operator 31. It will be understood that vertical members 38 may be positioned at an angle other than right angles to one or both of top and bottom rails when handrail assembly 30 is in the fully expanded position without departing from the scope of the invention. When handrail assembly 30 is fully expanded first and second end sections 32e, 32f are substantially aligned with the top rail of the stair handrail so that operator 31 is able to walk up stairs 26 holding on to stair handrail 28 to steady themselves, and will be able to transition readily and safely to first and second end sections 32e, 32f as they move from stairs 26 to top wall 24. Once on top wall 24, operator 31 is able to walk between first and second members 32a, 32b of top rail 32 to reach the desired fill port 22. Top rail 32 and safety wires 40 ensure that operator 31 will be less likely to fall off top wall 24 of tank 18.

Once operator 31 has finished with fill ports 22, they walk along top wall 24 to rear end 18a of tank 18 and, using first and second end sections 32e, 32f to steady themselves; they step off top wall 24 and onto stairs 26. Once the operator 31 is back on the ground, they will engage switch 94 to move handrail assembly 30 from the expanded position to the collapsed position. Engaging switch 94 causes controller 92 to deactivate fluid supply 88. Air is drawn out of hoses 90 and back into supply 88 and this air movement also causes a pressure drop in cylinders 80 thereby causing piston rods 87 to be drawn back into housings 89 in the direction of arrow "A" (FIG. 11). As each piston rod 87 moves back into the associated housing 89, the end first end 80a thereof pivots about pivot pin 83, 85 on mounting bracket 82. The motion causes the vertical member 38 associated therewith to pivot downwardly in the direction of arrow "B" (FIG. 11) toward bottom rails 34, 36 and about pivot pins 74, 60 in first and second yoke assemblies 48, 46. Top rail 32 moves vertically downwardly in the direction of arrow "C" toward bottom rails 34, 36 until a portion of first and second members 32a, 32b thereof is seated in the support members 100 of support assemblies 96 as shown in FIG. 13.

It should be noted that when handrail assembly 30 is moved from the expanded position to the collapsed position the movement in the direction of arrow "D" (FIG. 14) is both downwardly toward top wall 24 of tank 18 and rearwardly toward rear end 18a of tank 18. Similarly, when handrail assembly 30 is moved from the collapsed position to the expanded position, the motion is in the opposite direction to arrow "D" and is both upwardly away from top wall 24 of tank and forwardly toward front end 18b of tank 18.

It will be understood that in some instances, bottom rails 34/36 may be completely omitted and lower mounting assemblies 48 may be welded directly to mounts 35 which are welded to the top wall 24 or side walls of tank 18. In this instance, vertical members 38 will extend between lower mounting assemblies 48 to top rail 32 instead of between top and bottom rails 32, 34, 36.

Figure 15:
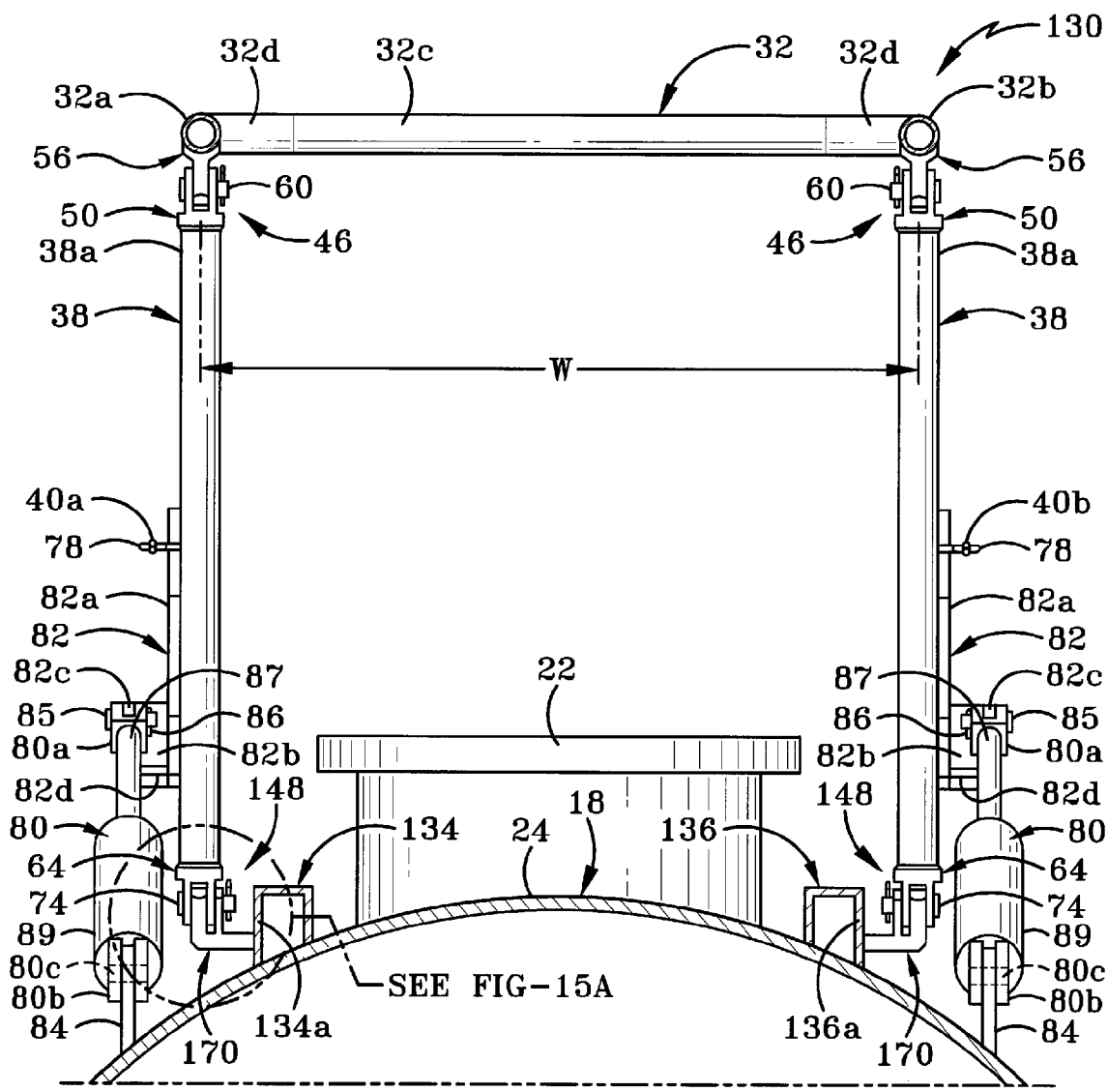
FIG. 15 is a rear cross-sectional view of a second embodiment of a handrail assembly in accordance with the present invention showing an alternative second yoke assembly.
Figure 15A:
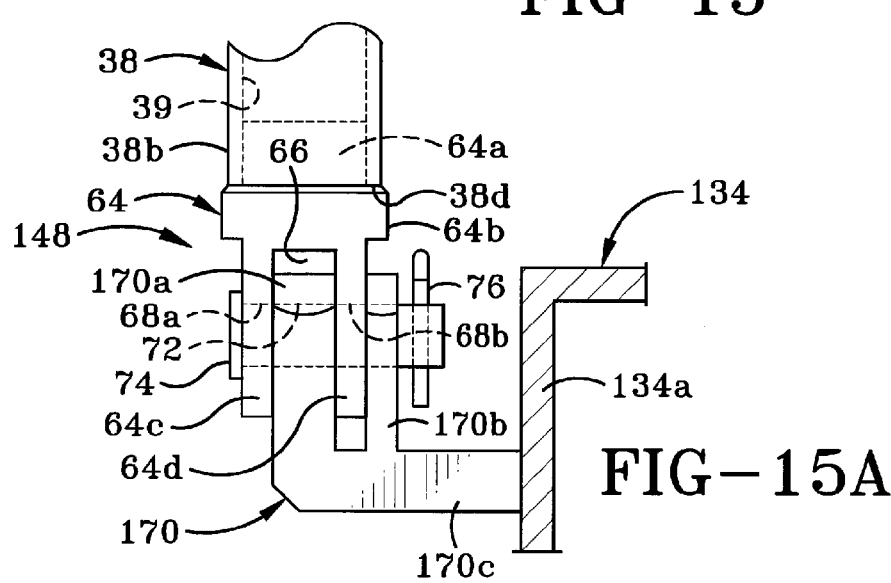
FIG. 15A is an enlargement of the highlighted region of FIG. 15.

FIG. 15 shows a second embodiment of a handrail assembly in accordance with the present invention, generally indicated at 130. Substantially the entire assembly 130 is identical to handrail assembly 30 with the exception of the configuration of the bottom rails 134, 136 and the second yoke assemblies 148. In this instance, bottom rails 134, 136 are substantially rectangular in cross-section and extend along the length of the tank 18. Each second yoke assembly 148 is comprised of a base member 64 and a cradle member 170. Base member 64 is substantially identical to the base member 64 of second yoke assembly 48. Cradle member 170 differs from cradle member 70 in that it is generally F-shaped and comprises a stem 170a, a leg 170b and an extension 170c. Stem 170a and leg 170b extend outwardly from extension and generally at right angles thereto. Stem 170a and leg 170b are substantially parallel to each other and are spaced a distance apart such that a gap (unnumbered) is defined therebetween. The gap is sized to receive one of arms 64c, 64c of base member 64 therein. Although not shown in FIG. 15, it should be understood that each of stem 170a and leg 170b define an aperture therein that is disposed generally parallel to extension 170c. The apertures in stem 170a and leg 170b are aligned with each other and are alignable with the apertures 68a, 68b (FIG. 5) of base member 64. Pin 74 is receivable through these aligned apertures in base member 64 and cradle member 170 to secure the components together. Cotter pin 76 is received through a hole in pin 74 to lock the same in engagement with base member 64 and cradle member 170. Extension 170c is welded or otherwise secured to an exterior vertical side wall 134a, 136a of one of bottom rails 134, 136. This arrangement enables first and second top sections 32a, 32b of top rail 32 to be offset relative to the respective bottom rail 134, 136. Additionally, cylinders 80 are mounted to tank 18 and vertical members 38 in such a location that they are disposed exteriorly of vertical members 38 instead of interiorly relative thereto as shown in FIG. 8. This arrangement is used to widen the horizontal distance "W" between first and second top sections 32a, 32b so that there is adequate room for operator 31 to move therebetween.

Figure 16:
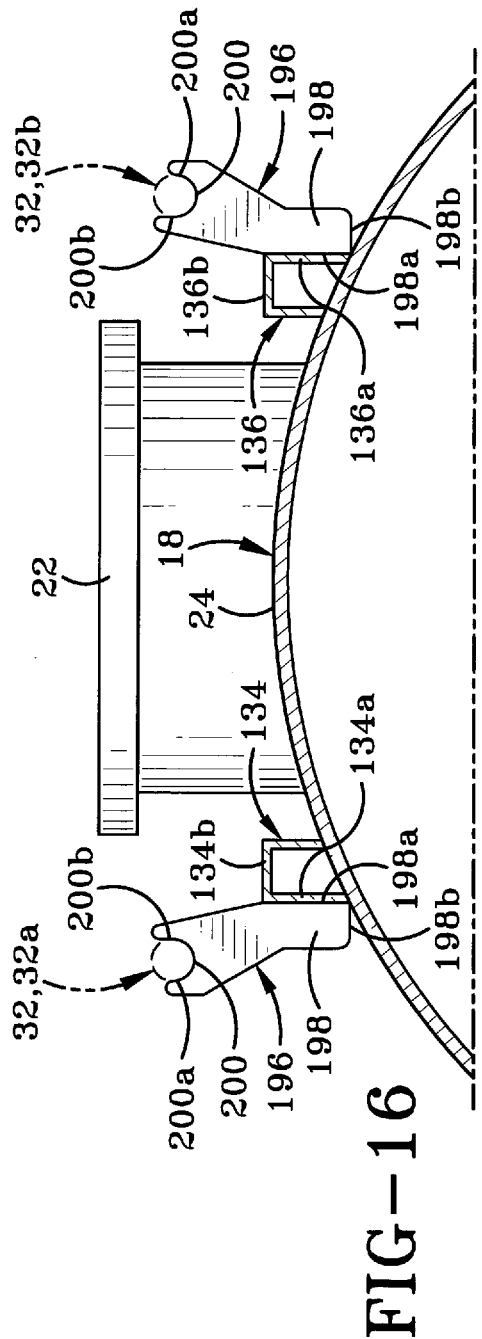
FIG. 16 is a rear view a portion of the top wall of the tank trailer showing a fill port and an alternative support assembly.

FIG. 16 illustrates an alternative embodiment of a support assembly 196 used when bottom rails 134, 136 are provided on tank 18 and the first and second top sections 32a, 32b of top rail 32 are offset relative thereto. In this instance, support assemblies 196 comprise a generally Y-shaped pedestal 198 having a recess 200 in an upper end thereof. Pedestal 198 is substantially wider than pedestal 98 of support assembly 96. A sidewall 198a of pedestal 198 is welded or otherwise secured to exterior sidewall 134a, 136a of bottom rail 134, 136 instead of the bottom end 198b, being welded or otherwise secured to the top end 134b, 136b of bottom rail 134, 136. Recess 200 is complementary shaped to a portion of the exterior surface of top rail 32. Specifically, recess 200 is curved to a sufficient degree that a pair of fingers 200a, 200b extends upwardly for a distance to at least partially surround a portion of one of first and second top sections 32a, 32b of top rail 32 when it is received therein.

Figure 18:
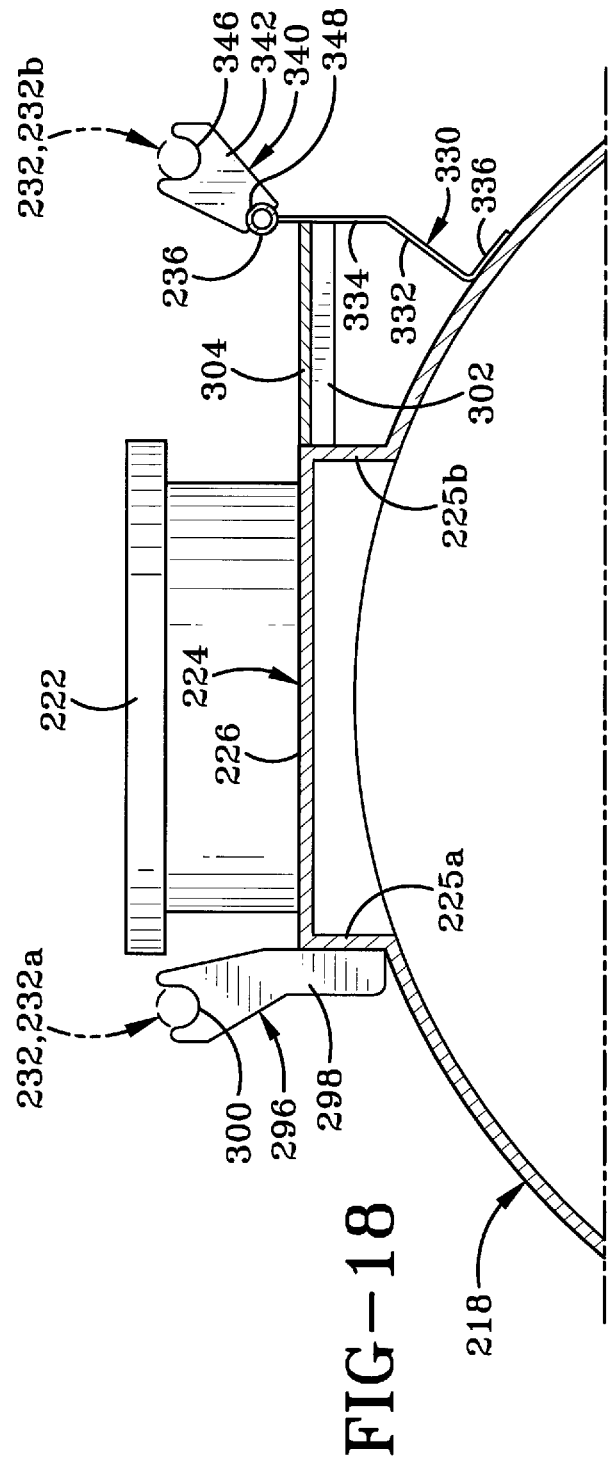
FIG. 18 is a rear cross-sectional view of the different type of tank trailer top wall showing an alternative support assembly for supporting the top rail when the handrail is in the collapsed position.
Figure 17:
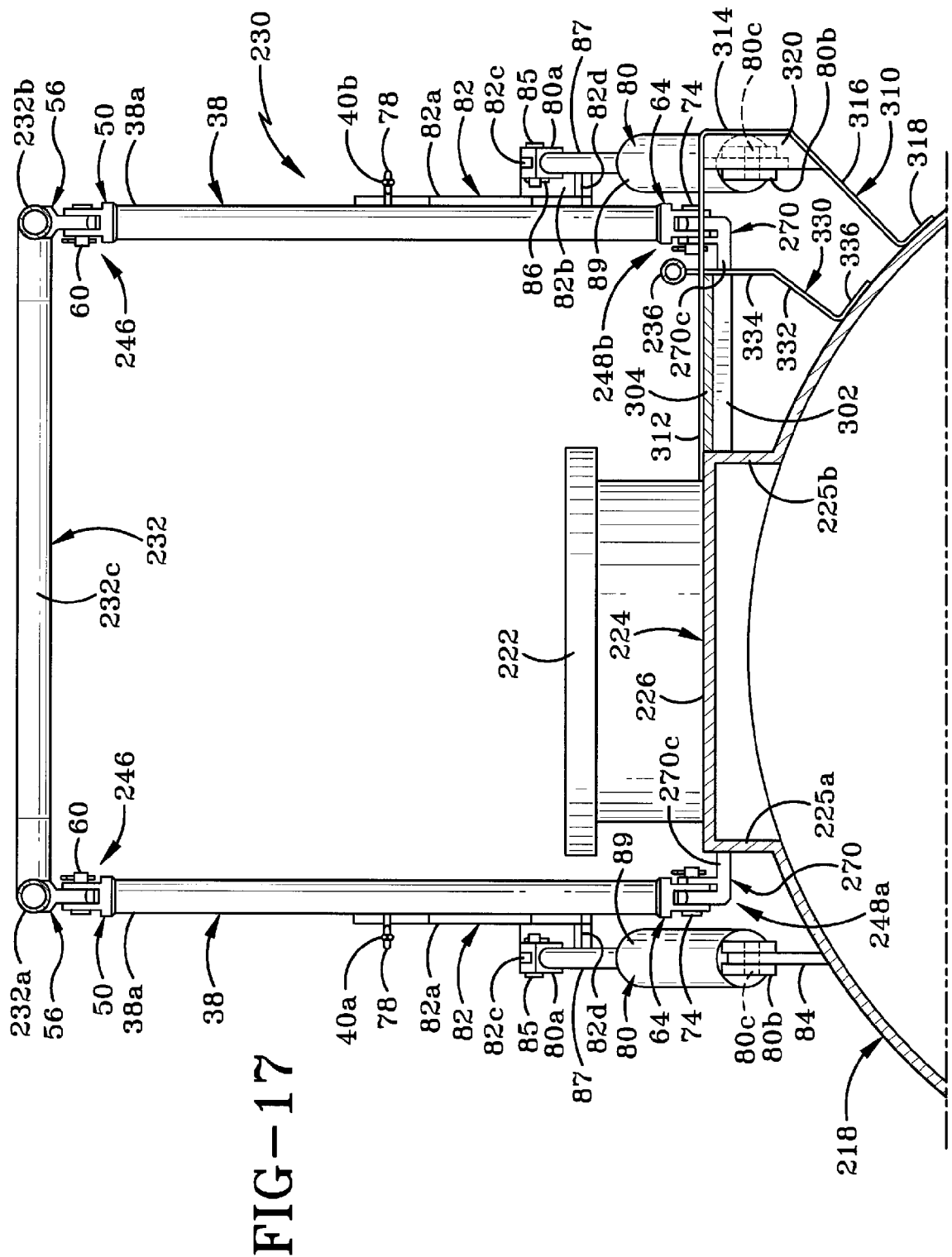
FIG. 17 is a rear cross-sectional view of a third embodiment of a handrail assembly in accordance with the present invention shown on a different type of tank trailer top wall and showing yet another alternative second yoke assembly and an alternative manner of mounting one end of the cylinder.

Referring to FIGS. 17 & 18, there is shown yet another embodiment of a handrail assembly in accordance with the present invention and generally indicated at 230. Handrail assembly 230 is substantially identical to handrail assembly 130 with the exception of how some of the second yoke assemblies 248 and some of the cylinders 80 are secured to the tank. Handrail assembly 230 is used in vehicles where the tank 218 is differently configured to tank 18. Tank 218 has curved sidewalls as does tank 18, but the top wall 224 differs from top wall 24 in that it includes a pair of vertical walls 225a, 225b which extend upwardly therefrom and are spanned by a substantially flat section 226. A catwalk 304 preferably extends laterally outwardly from wall 225b and runs along substantially along the entire length of tank 218. Bracing 302 is provided at least at intervals beneath catwalk 304 to strengthen same. Cylinders 80 are mounted exteriorly of vertical members 38. Second yoke assemblies 248 are substantially identical to second yoke assemblies 148. Handrail assembly 230 includes a top rail 232 having a first top section 232a, a second top section 232b and a connector section 232c. A plurality of vertical members 38 are secured to first top section 232a. The second yoke assemblies 248a secured to these vertical members 38 are secured by their extensions 270 directly to vertical wall 225a. A second plurality of vertical members 38 are secured to second top section 232b. The second yoke assemblies 248b secured to these vertical members 38 are not secured to vertical wall 225b. Instead, a plurality of brackets 330 are provided at intervals along the length of tank 218, and second yoke assemblies 248b are secured to these brackets 330. Each of second yoke assemblies 248a, 248b is substantially identical to second yoke assembly 148 and comprises a base member 64 and a cradle member 270. Cradle member 270 of each second yoke assembly 248a is welded or otherwise secured to vertical wall 225a. Cradle member 270 of each second yoke assembly 248b is secured to one of brackets 330. Bracket 330 includes a first leg 336 that is welded or otherwise secured to a curved region of the exterior wall of tank 218. Bracket 330 further includes a second leg 332 that extends vertically outwardly from one end of first leg 336, and a third leg 334 that extends outwardly from a top end of second leg 332 and at an obtuse angle relative thereto. Third leg 334 is oriented so that it is substantially parallel to and spaced apart from vertical wall 225b. A bottom rail 236 is welded or otherwise secured to a top end of the third legs 334 or the brackets 330 that are spaced at intervals along top wall 224. The extension 270c of each second yoke assembly 248b is welded or otherwise secured to a third leg 334 of one of these brackets 330. Second top section 232b is offset relative to bottom rail 236 and is disposed exteriorly thereof.

An additional mounting bracket 310 is provided for mounting the second end 80b of the cylinder 80 which is disposed proximate vertical member 38 disposed adjacent catwalk 304. Mounting bracket 310 includes a first leg 312 which is secured at a first end to flat wall 226 of top wall 224 and to catwalk 304 and extends outwardly for a distance beyond the outermost edge of the catwalk 304. Bracket 310 further includes a second leg 314 disposed at right angles relative to first leg and extending downwardly from a second end of the first leg 312. A third leg 316 extends downwardly and inwardly from second leg 314 and at an obtuse angle thereto. Third leg 316 extends inwardly toward the curved side wall of tank 218. Bracket 310 further includes a fourth leg 318 disposed substantially at right angles to third leg 316. Fourth leg 318 is welded or otherwise secured to the curved side wall of tank 218. A brace 320 extends between first, second and third legs 312, 314, 316 of bracket 310 to provide adequate strength thereto to support cylinder 80 thereon. Second end 80b of cylinder 80b is engaged with brace 320 and one or more of first, second and third legs 312, 314, 316.

FIG. 18 illustrates support assemblies 296, 340 used to support first and second top sections 232a, 232b of top rail 232 when handrail assembly 230 is in the collapsed position. Support assembly 296 is substantially identical to support assembly 196. Support assembly 340 is secured to bottom rail 236 and includes a pedestal 342 having a first shaped surface 346 and a second shaped surface 348 defined therein. The shape of surface 346 is complementary to a portion of the exterior surface of second top section 232b. The shape of surface 348 is complementary to a portion of the exterior surface of bottom rail 236. Pedestal 342 is welded or otherwise secured to bottom rail 236 so that second top section 232b is disposed offset to bottom rail 236. Specifically, second top section 232b is disposed further outwardly from fill port 222 than is bottom rail 236. As such, support assembly 340 is inclined at an obtuse angle relative to third leg 334 of bracket 330. Support assembly 340 includes first and second fingers 346a, 346b that extend upwardly for a distance and at least partially surround second top section 232b when seated therein when handrail assembly 230 is in the collapsed position. A plurality of support assemblies are provided at intervals along the length of tank 218 to support the first and second top sections 232a, 232b when handrail assembly is moved to the collapsed position.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A handrail assembly for a tank trailer, where a tank of the tank trailer has a top wall extending longitudinally between a front end and a rear end of the trailer, and at least one fill port is disposed on the top wall; said handrail assembly comprising:
   a top rail;
   at least one vertical member having a first end and a second end;
   at least one first yoke assembly; each of which pivotally secures the first end of one the vertical members to the top rail;
   at least one second yoke assembly; each of which engages the second end of one of the vertical members and is adapted to pivotally secure the respective vertical member to the tank; and wherein the first yoke assembly comprises:
      a base member at least partially received into a longitudinal bore of the vertical member,
      a cradle member configured to engage an exterior region of a sidewall of the top rail;
      a pivot pin extending through aligned apertures defined in the base member and cradle member; and;
   at least one fluid cylinder having a first end and a second end, wherein the first end of the cylinder is pivotally engaged with the vertical member and the second end of the cylinder is adapted to pivotally engage the tank, and wherein said cylinder is operable to move the handrail assembly between a collapsed position and an expanded position, and when the handrail assembly is in the collapsed position the top rail is adapted to be disposed proximate the top wall of the tank, and when in the expanded position the top rail is adapted to be disposed a spaced distance vertically from the top wall of the tank.

2. The handrail assembly as defined in claim 1, further comprising:
   a bottom rail adapted to be fixedly secured to the tank, said bottom rail being disposed substantially parallel to the top rail; and wherein the second yoke assembly is engaged with the bottom rail, so that the bottom rail is disposed between the second yoke assembly and the tank.

3. The handrail assembly as defined in claim 2, wherein the top rail has a first end and a second end and a longitudinal axis extending therebetween; and wherein the first and second yoke assemblies each include a pivot pin that is disposed substantially at right angles to the longitudinal axis, and when the handrail assembly moves between the collapsed and expanded positions, the vertical member and top rail remain aligned with the longitudinal axis of the top rail.

4. The handrail assembly as defined in claim 2, further comprising:
   the at least one vertical member further comprising three vertical members;

the at least one first yoke assembly further comprising three first yoke assemblies, each of the first yoke assemblies pivotally securing the first end of one of the vertical members to the top rail such that the vertical members are spaced at intervals from each other;
the at least one second yoke assembly further comprising three second yoke assemblies, each of the second yoke assemblies being secured to the second end of one of the vertical members and to the bottom rail; and
the at least one fluid cylinders further comprising three fluid cylinders for moving the handrail assembly between the expanded and collapsed positions, each of the cylinders being operationally connected to a different one of the vertical members.

5. The handrail assembly as defined in claim 4, wherein the top rail includes:
a first top section adapted to be disposed proximate a first sidewall of the tank; and
a second top section adapted to be disposed proximate a second sidewall of the tank so that the first and second sections are substantially parallel to each other and spaced laterally apart from each other.

6. The handrail assembly as defined in claim 5, further comprising:
a second bottom rail spaced a distance laterally from the bottom rail, and wherein two of the at least three vertical members are secured between the first top section and the bottom rail, and the remaining one of the at least three vertical members is secured between the second top section and the second bottom rail; and wherein two of the at least three cylinders are engaged with the two vertical members secured to the first top section, and the remaining one of the at least three cylinders is engaged with the vertical member secured to the second top section.

7. The handrail assembly as defined in claim 6, wherein a first one of the two vertical members and an associated first one of the two cylinders is adapted to be disposed proximate the front end of the trailer; and a second one of the two vertical members and an associated second one of the two cylinders is adapted to be disposed proximate the rear end of the trailer.

8. The handrail assembly as defined in claim 7, wherein the third one of the at least three cylinders and an associated third one of the three cylinders is adapted to be disposed proximate one of the front end and rear end of the trailer.

9. The handrail assembly as defined in claim 5, wherein the top rail further includes:
a connector section that extends between a first end of the first top section and a first end of the second top section, such that the top rail is substantially U-shaped when viewed from above.

10. The handrail assembly as defined in claim 9, wherein the top rail further includes:
a first end section extending outwardly and downwardly at an angle from a second end of the first top section.

11. The handrail assembly as defined in claim 10, wherein the angle is such that when the handrail assembly is in the expanded position, the first end section is adapted to be generally aligned with a stair handrail disposed adjacent a plurality of stairs on the rear end of the tank.

12. The handrail assembly as defined in claim 2, wherein each second yolk assembly comprises:
a second base member at least partially received into the longitudinal bore of the vertical member; said second base member being disposed at an opposite one of the first and second ends of the vertical member with respect to the base member of the first yoke assembly;
a second cradle member configured to engage an exterior region of a sidewall of the bottom rail; and
a second pivot pin extending through aligned apertures defined in the second base member and the second cradle member.

13. The handrail assembly as defined in claim 12, wherein the cradle and second cradle are each generally Y-shaped having a stem and a pair of legs which extend outwardly away from one end of the stem; and wherein the base member and the second base member each define a gap therein, and the stem of the one of the cradle and second cradle is received in the gap of the associated base member and the second base member.

14. The handrail assembly as defined in claim 13, wherein the pivot pin and second pivot pin pass through an aperture in the associated one of the stem and second stem.

15. The handrail assembly as defined in claim 13, wherein the gap has a width and the stem has a width, and the widths of the stem and gap are substantially equal.

16. The handrail assembly as defined in claim 1, further comprising a support assembly adapted to be secured to the tank a spaced distance from the second yoke assembly, said support assembly being configured to support a portion of the top rail thereon when the handrail assembly is in the collapsed position.

17. The handrail assembly as defined in claim 16, wherein the support assembly comprises:
a pedestal having a first end and a second end, where the second end of the pedestal is adapted to be fixedly secured to the tank; and
the first end of the pedestal includes a face complementary in cross-sectional shape to a portion of the top rail, and wherein the portion of the top rail is received in the first end of the pedestal and in abutting contact with the face when the handrail assembly is in the collapsed position.

18. The handrail assembly as defined in claim 17, wherein the first end of the pedestal further includes a first and a second finger each having an interior surface that defines a portion of the face, and wherein the first and the second fingers are configured to at least partially extend around the portion of the top rail to retain the same therein.

19. In combination:
a tank trailer including:
a tank having a top wall extending longitudinally between a front end and a rear end thereof;
at least one fill port disposed on the top wall of the tank and having access into an interior chamber within the tank;
a plurality of stairs provided at the rear end of the tank, said stairs ascending from a bottom of the tank to the top wall thereof; and
a stair handrail disposed along at least one side of the stairs; and
a handrail assembly disposed on the top wall of the tank; said handrail assembly comprising:
a top rail;
a plurality of vertical members, each vertical member having a first end and a second end;
a plurality of first yoke assemblies, each first yoke assembly pivotally securing the first end of one of the plurality of vertical members to the top rail; wherein each first yoke assembly comprises:
a base member at least partially received into a longitudinal bore of the vertical member,
a cradle member configured to engage an exterior region of a sidewall of the top rail; and a pivot pin extending through aligned apertures defined in the base member and cradle member;

a plurality of second yoke assemblies, each second yoke assembly pivotally securing the second end of one of the plurality of vertical members to a region of the tank adjacent the top wall thereof; and at least three fluid cylinders, each fluid cylinder having a first end and a second end, wherein the first end of the cylinder is pivotally engaged with the vertical member and the second end of the cylinder is pivotally engaged with a portion of the tank, and wherein said cylinder is operable to move the handrail assembly between a collapsed position and an expanded position, and when the handrail assembly is in the collapsed position the top rail is disposed proximate the top wall of the tank, and when in the expanded position the top rail is disposed a spaced distance vertically from the top wall of the tank.

20. The combination as defined in claim 19, further comprising a bottom rail disposed substantially parallel to the top rail and fixedly secured to the tank, and wherein the second yoke assemblies secure the second end of the vertical members to the bottom rail.

21. The combination as defined in claim 20, further comprising:

a plurality of support assemblies disposed at intervals along the tank, each support assembly being individually engaged with the tank in an area where it is aligned with the top rail, and wherein each support assembly is configured to receive a region of the top rail therein when the handrail assembly is in the collapsed position.

22. The combination as defined in claim 21, wherein each support assembly is spaced a distance longitudinally from one of the second yoke assemblies, and each support assembly comprises:

a pedestal having a first end and a second end, where the first end is fixedly secured to the tank; and wherein a face is provided at the second end of the pedestal and the face is complementary shaped to at least a portion of the region of the top rail it is to support.

23. The combination as defined in claim 19, further comprising:

a fluid supply, one or more hoses extending between the fluid supply and the fluid cylinders; and a controller connected to the fluid supply and being activatable to supply fluid to or remove fluid from the fluid cylinders.

24. The combination as defined in claim 19, wherein the top rail has a first end and a second end, and the second end is disposed proximate the rear end of the tank, and wherein the top rail further includes:

a first end section extending outwardly and downwardly at an angle from the second end, wherein the angle is such that when the handrail assembly is in the expanded position, the first end section is generally longitudinally aligned with the stair handrail disposed adjacent the stairs on the rear end of the tank.

25. The combination as defined in claim 24, wherein the top rail and the vertical members remain longitudinally aligned with each other at all times when the handrail assembly is moved between the expanded position and the collapsed position.

26. The combination of claim 19, wherein the top rail is disposed a distance vertically above a top surface of the at least one fill port when the handrail assembly is in the expanded position and is disposed a distance vertically beneath the top surface of the at least one fill port when the handrail assembly is in the collapsed position.

* * * * *